(12) United States Patent
Fan et al.

(10) Patent No.: US 7,546,354 B1
(45) Date of Patent: Jun. 9, 2009

(54) DYNAMIC NETWORK BASED STORAGE WITH HIGH AVAILABILITY

(75) Inventors: Chenggong Charles Fan, San Marino, CA (US); Srinivas M. Aji, Pasadena, CA (US); Jehoshua Bruck, La Canada, CA (US)

(73) Assignee: EMC Corporation, Hopkinton, MA (US)

( * ) Notice: Subject to any disclaimer, the term of this patent is extended or adjusted under 35 U.S.C. 154(b) by 1584 days.

(21) Appl. No.: 10/188,626

(22) Filed: Jul. 1, 2002

Related U.S. Application Data

(60) Provisional application No. 60/303,649, filed on Jul. 6, 2001, provisional application No. 60/363,339, filed on Mar. 8, 2002.

(51) Int. Cl.
G06F 15/16 (2006.01)
G06F 11/00 (2006.01)

(52) U.S. Cl. .................................. 709/219; 714/12

(58) Field of Classification Search ................. 709/219; 714/12
See application file for complete search history.

(56) References Cited

U.S. PATENT DOCUMENTS

| 5,146,571 | A | * | 9/1992 | Logan ........................... 714/8 |
| 5,564,037 | A | * | 10/1996 | Lam ............................ 711/161 |
| 5,689,701 | A | * | 11/1997 | Ault et al. ..................... 707/10 |
| 5,937,406 | A | * | 8/1999 | Balabine et al. .............. 707/100 |
| 5,948,062 | A | * | 9/1999 | Tzelnic et al. ................ 709/219 |
| 6,266,753 | B1 | * | 7/2001 | Hicok et al. ................. 711/202 |
| 6,324,581 | B1 | * | 11/2001 | Xu et al. ...................... 709/229 |
| 6,324,627 | B1 | * | 11/2001 | Kricheff et al. .............. 711/163 |
| 6,360,306 | B1 | * | 3/2002 | Bergsten ....................... 711/162 |
| 6,449,739 | B1 | * | 9/2002 | Landan ......................... 709/224 |
| 6,453,354 | B1 | * | 9/2002 | Jiang et al. ................... 709/229 |
| 6,473,795 | B1 | * | 10/2002 | Danielson et al. ............ 709/224 |
| 6,553,391 | B1 | * | 4/2003 | Goldring et al. ............. 707/203 |
| 6,560,614 | B1 | * | 5/2003 | Barboy et al. ................ 707/201 |
| 6,654,794 | B1 | * | 11/2003 | French ......................... 709/217 |
| 6,779,016 | B1 | * | 8/2004 | Aziz et al. ................... 709/201 |
| 6,792,460 | B2 | * | 9/2004 | Oulu et al. ................... 709/224 |
| 7,047,291 | B2 | * | 5/2006 | Breese et al. ................ 709/223 |
| 2001/0047400 | A1 | * | 11/2001 | Coates et al. ................ 709/219 |
| 2002/0046317 | A1 | * | 4/2002 | Houston et al. ................ 711/5 |
| 2002/0157089 | A1 | * | 10/2002 | Patel et al. ................... 717/178 |
| 2002/0161855 | A1 | * | 10/2002 | Manczak et al. ............. 709/219 |
| 2003/0051117 | A1 | * | 3/2003 | Burch et al. ................. 711/173 |

(Continued)

OTHER PUBLICATIONS

Gibson et al., "Network Attached Storage Architecture," *Communications of the ACM*, Nov. 2000/vol. 43, No. 11 p. 37-46.

(Continued)

*Primary Examiner*—Larry D Donaghue
*Assistant Examiner*—Ajay Bhatia
(74) *Attorney, Agent, or Firm*—Barry N. Young

(57) ABSTRACT

The present invention provides a scalable, highly available distributed network data storage system that efficiently and reliably provides network clients and application servers with access to large data stores, such as NAS units, and manages client and server requests for data from the data stores, thereby comprising a distributed storage manager. A storage manager constructed in accordance with the invention can receive and process network requests for data at a large, aggregated network data store, such as a collection of NAS units, and can manage data traffic between the network clients and NAS units.

34 Claims, 26 Drawing Sheets

U.S. PATENT DOCUMENTS

2004/0030731 A1* 2/2004 Iftode et al. .................. 707/205
2004/0093356 A1* 5/2004 Sharpe et al. ............... 707/200
2004/0267830 A1* 12/2004 Wong et al. ................. 707/200
2005/0044075 A1* 2/2005 Steere et al. ................... 707/4
2005/0131955 A1* 6/2005 Borthakur et al. ........... 707/200

OTHER PUBLICATIONS

Hesselink, "Ultra-High-Density Data Storage," Communications of the ACM, Nov. 2000/vol. 43. No. 11 p. 33-36.

* cited by examiner

In-Path Mode
(Single Switch)

Cluster: rs1 > RainStorage

File Servers on rs1

File Servers

Click on server name to view access stats

| rssun2 | | Available Size | Total Size |
|---|---|---|---|
| | /home | 5592594 | 5704765 |
| rssun1 | | Available Size | Total Size |
| | /home | 5553178 | 5704765 |
| filer | | Available Size | Total Size |
| | /vo/vol0/users/abc | 62434940 | 62593232 |
| | /vo/vol0/users | 62434940 | 62593232 |
| | /vo/vol0/src | 62434940 | 62593232 |
| | /vo/vol0/home | 62434940 | 62593232 |
| | /vo/vol0/dest | 62434940 | 62593232 |
| | /vo/vol0 | 62434940 | 62593232 |

| SIG 2002 | SEQ. 2004 | MEMBERSHIP 2006 | VIP LIST & ASSIGNMENTS 2008 | LOAD & BYTE COUNT 2010 | CONFIG 2012 | HISTORY 2016 | TRANSLATION TABLES 2020 | CURRENT STATUS 2024 |
|---|---|---|---|---|---|---|---|---|

FIG. 20

DYNAMIC NETWORK BASED STORAGE WITH HIGH AVAILABILITY

REFERENCE TO PRIORITY DOCUMENT

This application claims priority of co-pending U.S. Provisional Patent Application Ser. No. 60/303,649 entitled "Distributed Network Router for Storage Management" by C. Fan, filed Jul. 6, 2001 and co-pending U.S. Provisional Patent Application Ser. No. 60/363,339 entitled "Dynamic Network-Based Storage with High Availability" by C. Fan, filed Mar. 8, 2002. Priority of the filing dates of Jul. 6, 2001 and Mar. 8, 2002 is hereby claimed, and the disclosure of the Provisional Patent Applications are hereby incorporated by reference.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates generally to computer network data and, more particularly, to processing computer network requests for files and for data storage.

2. Description of the Related Art

Network-connected computers provide an efficient means of sharing information. A convenient way of storing information for computer access is to store the information in electronic form in a data storage unit that is attached to the computer network. If the stored data can be accessed by any of the computers that are connected to the network, it is easier for persons to share the data they have created, thereby making collaboration easier.

The Internet is currently the largest and most widely used computer network. Information and data are transported across the Internet according to the Transport Control Protocol/Internet Protocol (TCP/IP). Many users request documents comprising pages in hypertext mark-up language (HTML) format from among the millions of pages of data that are stored at Internet-connected file servers. As used herein, a server refers to a network computer that services and manages requests for documents or data files from network-connected computers utilizing wired and wireless communication links. Other types of Internet servers may control access to particular types of data files, and may comprise multimedia file (including video and audio) servers, mail servers, and e-commerce servers. Some servers route such requests to an appropriate computer within a cluster of computers, each of which performs one of these server functions. Such clusters of computers are generally referred to as server farms. The Internet, however, is only one type of network for which large capacity data storage solutions have become critically important.

Many companies, universities, and other organizations run their own internal computer networks (commonly called intranets) and share data files using TCP/IP and other data transport protocols. Computer users in such organizations may share access to computer files, such as documents, by sending a request to a network resource, also referred to as pointing their computer to a particular network-connected resource, which those skilled in the art will recognize as network drives. As computer networks have proliferated, the need for network data storage has increased at a rapid rate.

Data storage solutions typically have been relatively large-capacity disk drive units attached to a file server computer. When the need for data storage became too large to make storage at a disk drive unit practical, other storage solutions were developed. It is now common to provide large capacity network storage solutions in the form of a RAID (Redundant Array of Independent Disks) array. A RAID array typically integrates several disk drive data storage units. It is not unusual for a RAID array to have a storage capacity of hundreds of gigabytes. A data management controller of the RAID array handles processing for storage and retrieval of data files between the RAID array and the network.

When a network client accesses the RAID array, the data path to the array of disks appears to the client as a single network resource or drive letter. The RAID data management controller will typically implement a data redundancy strategy to ensure adequate data recovery in the event of a failure of a disk drive unit of the RAID array. Regardless of the storage capacity of any one disk drive making up the RAID array, the capacity of the RAID array may be specified as a number of data volumes. The RAID controller will automatically map the data volumes to the actual physical locations among the disk drive units of the array. Typically, the RAID controller will automatically split a single data file so that it is stored among the RAID disks, storing records of the file in virtual data volumes spread across the multiple disks, with parity checking for a redundancy strategy. Thus, an Internet file server might receive requests from network clients for Web pages, then can retrieve one or more files comprising a Web page by accessing a RAID array through a data path as a single network resource. The retrieved data files from the RAID array can then be served to the network clients.

More recently, network data storage requirements have evolved to the stage where a data storage solution called network attached storage (NAS) has been developed. The NAS solution is a high-capacity network data storage system. Thus, the NAS appears to network nodes (network-connected client computers) as a single disk drive resource, and client computers can access and manipulate files at the NAS with local file system commands. An NAS system, however, may include multiple file servers, each of which may comprise a RAID array. To a client computer at a network node accessing an NAS system, the system appears as a single resource, so that data files stored at the NAS system can be accessed by specifying a data path having a single network drive letter. This is true even though the actual data file may be physically located on any one of the drives that make up the system, split across one or more disks of a RAID array, or split across one or more RAID arrays of the NAS. A data management controller of the NAS handles receiving requests for data files and keeping track of the actual drive(s) on which any one data file is located. An NAS system may have a capacity of more than one terabyte (one thousand gigabytes). It should be apparent that the management tasks of an NAS system for data management can be much more complex than is the case with a typical RAID array.

Typically, an NAS system sends and receives data with network computers using a network communications protocol, such as TCP/IP. Thus, the data storage communications are merged with the network communications. The NAS controller interfaces to the machines of the network (i.e., the client and server computers) using a network communications service such that a single network drive letter can be mapped to the file servers. Two services in wide use are the Network File System (NFS) for Unix-compatible machines, and the Common Internet File System (CIFS) for Microsoft Corporation Windows-compatible machines. Thus, network clients can directly access data files stored at the NAS system through a simple data path.

FIG. 1 is an illustration of a typical conventional NAS system 100 in which a data storage computer 102 called a "filer" or "NAS unit" includes multiple disk drive storage units 104 and communicates over a network 106 with multiple computer clients or application servers 108, 110, 112 to exchange data files. The network data transfer between the machines 102, 108, 110, 112 can occur using a data protocol such as, for example, TCP/IP. In this way, the NAS unit 102 interposes a network 106 between itself and the networked data application servers and clients 108, 110, 112.

Each one of the network nodes 108, 110, 112 can map the NAS unit 102 to their respective local file system so that the NAS unit becomes one of their accessible network resources. Thus, the NAS unit 102 is identified to each of the respective machines 108, 110, 112 as a storage volume, typically identified as a drive letter or volume name. Those skilled in the art will understand that a data file at the NAS unit therefore can be accessed from one of the nodes 108, 110, 112 by reference to a data file pathname that specifies the volume of the NAS unit, such as in the form of a drive letter (e.g., "d:\filename"). While the single volume of the NAS unit might include multiple storage drive units 104, when there are multiple NAS units for access by the network clients and servers, there will typically be multiple volumes, and multiple volumes need to be accessed using multiple drive letters. In other words, each NAS unit is mapped to a volume, and therefore a volume is limited to the storage size of one physical NAS unit.

Unfortunately, the need to reconfigure NAS units, such as to move data between NAS units, is time-consuming and disruptive to the system environment, particularly to the clients that need to access data. It is not unusual for more than half of the storage management cost to be spent in the maintenance of multiple NAS units, expended on tasks such as the movement of data files between the NAS units. Data may need to be moved between NAS units in a variety of circumstances, such as where an NAS unit has no more data storage space, where a new NAS unit is added to the system, or where data is simply being re-balanced among existing NAS units. During the data move process, one or more of the NAS units involved in the move will be unreachable to the clients and servers 108, 110, 112. In addition, if one NAS unit is added or deleted, the network clients must map a new volume to the new NAS unit. Consequently, there is a great inconvenience to network clients when data is moved or distributed among multiple network storage devices, as such data movement requires downtime on the part of the clients and the network storage devices. Because of these limitations, the NAS storage solution is not easily scalable beyond a single NAS unit. Many data storage sites have such great storage demands that they include multiple NAS units.

From the discussion above, it should be apparent that there is a need for a system that provides a more scalable and manageable data way of reconfiguring network storage devices that permits data to be moved and distributed among multiple network storage devices in a manner that is transparent to client machines on the network.

SUMMARY

Provided is a network data storage manager that can reconfigure network storage devices in a manner that is transparent to network client machines and that does not require downtime by the client machines or network storage devices. The storage manager can receive file movement instructions to move one or more data files from a first network storage device to a second network storage device. Pursuant to the instructions, the storage manager moves the data files from a first location at the first network storage device to a second location at the second network storage device and automatically maps the first location at the first network storage device to the second location at the second network storage device. A client machine can access the first data file using a data file pathname that does not change when the data file is moved from the first location to the second location to thereby render the data file move transparent to the client machine. The storage manager also provides network clients with uninterrupted access to the data that has been moved by automatically resolving conflicts where a network client attempts to access a data file before the file has been moved.

Other features and advantages of the present invention should be apparent from the following description, which illustrates, by way of example, the principles of the invention.

BRIEF DESCRIPTION OF THE DRAWINGS

FIG. 11 shows a screen shot of a display page from an exemplary GUI that provides status information for file servers managed by the storage manager.

FIG. 14 shows a screen shot of a display page from an exemplary GUI through which the system administrator can define a data movement transaction.

FIG. 20 is a representation of the Group Membership protocol word used by the storage manager machines of the storage manager of FIG. 2 in communicating status information in the computer system of the invention.

DETAILED DESCRIPTION

A network data storage system constructed in accordance with the present invention includes one or more network machines that provide a scalable, distributed, highly available storage manager between network data storage devices and networked client machines and servers. The storage manager can perform a data movement transaction wherein it moves data between network data storage devices in a manner that is transparent to network client machines. The data movement is transparent in that the client machines can access data files using a data file pathname that does not change even after the data has been moved from one location to another. Thus, network clients can access the moved data without having to use a new data file pathname. During movement of the data, the storage manager provides network clients with uninterrupted access to the data that is being moved.

The storage manager can be configured to balance loads on the NAS units, such as to balance data processing loads among multiple NAS units and to balance data storage loads among the units. The storage manager of the invention is constructed with a distributed architecture, so that multiple processor units each comprising a storage manager can cooperate together to provide the desired functionality of the collective whole. That is, the functionality of the collective group does not change with the number of processor units comprising the storage manager system. Thus the distributed storage manager does not present a single point of failure for access to the data files.

The distributed storage manager does not need to implement a file system of its own, but rather simply accesses the data files stored at the NAS units using their respective file systems. The distributed storage manager can accommodate stateless communication protocols for the data storage file system, such as NFS, and also can accommodate protocols that preserve state, such as CIFS. This flexibility is achieved by storing state information with the storage manager, and providing storage manager operation such that transparent recovery without broken network mapping connections can be provided in the event of a server failure. Additional functionalities can be integrated into the operation of the storage manager, such as increased data security safeguards and cache management within the storage manager.

1. The Distributed Storage Manager

Figure 1:
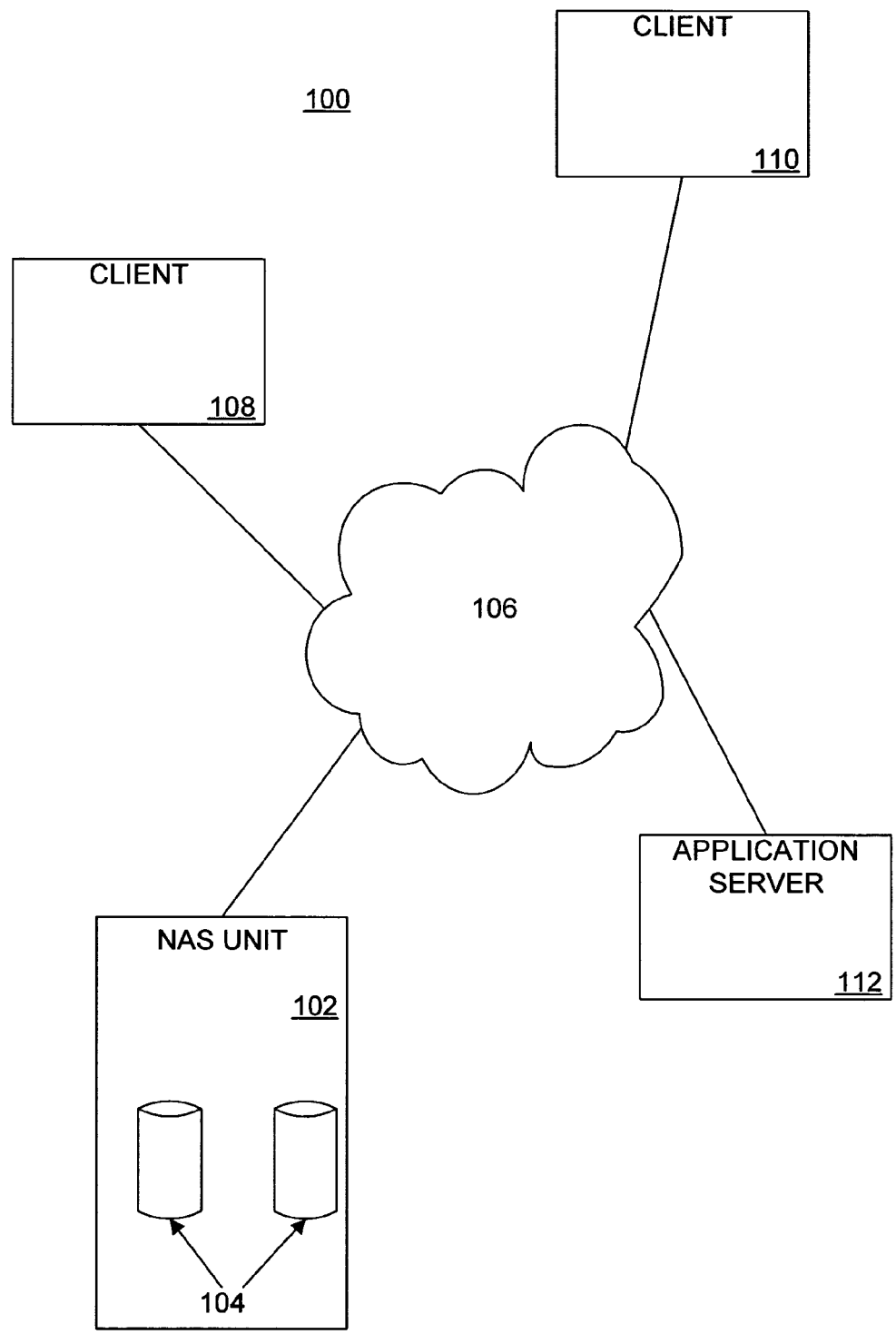
FIG. 1 is a schematic block diagram of a conventional network attached storage (NAS) filer unit showing the filer communicating with clients and application servers across a network.
Figure 2:
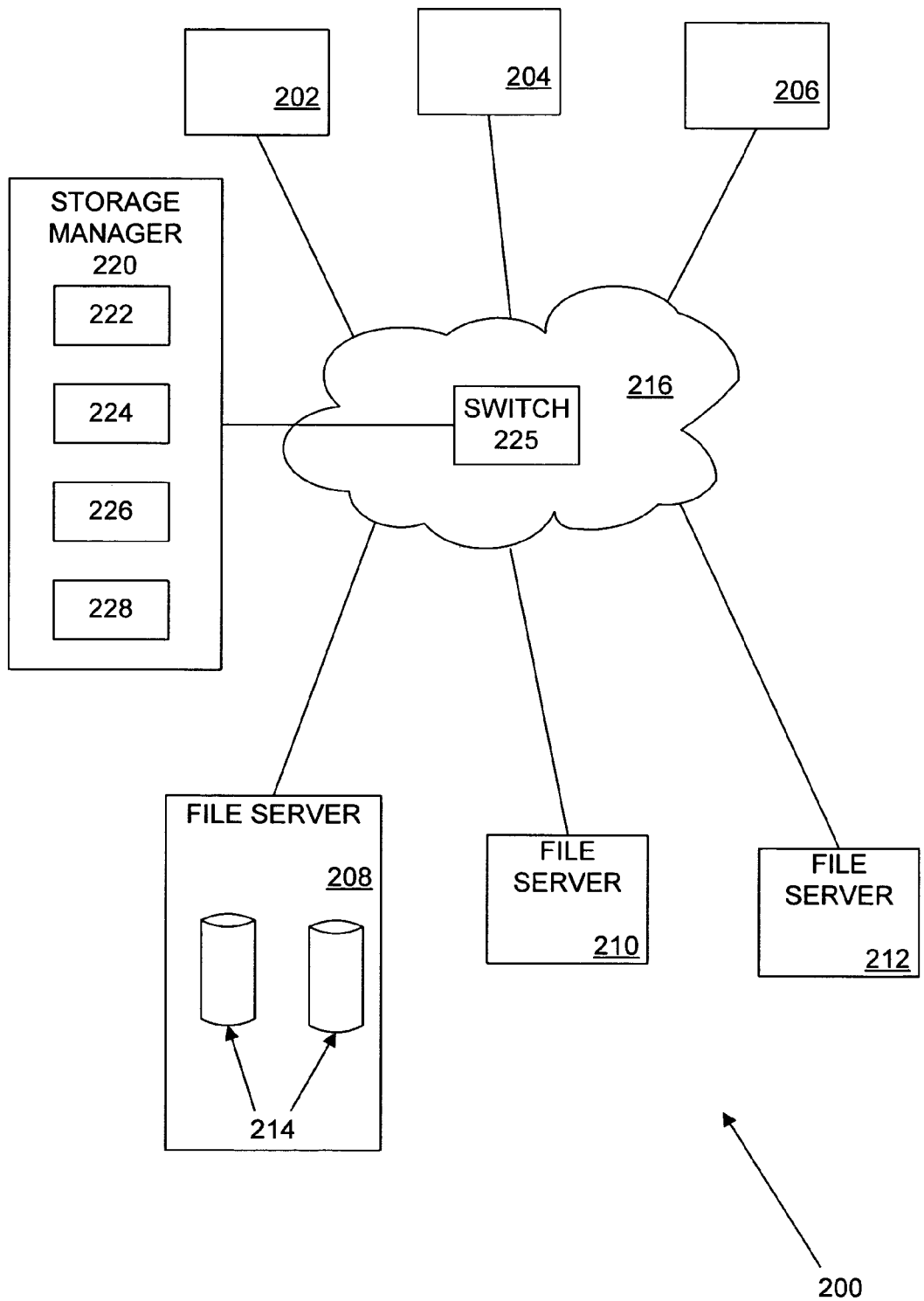
FIG. 2 is a schematic block diagram of a computer system constructed in accordance with the present invention to provide a storage manager.

FIG. 2 shows a system 200 constructed in accordance with the present invention to facilitate communication between multiple client machines (comprising users or application servers) 202, 204, 206 and network storage devices, such as file servers 208, 210, 212. The file servers 208, 210, 212 can comprise NAS units and can be incorporated into a storage area network (SAN). The file servers can be associated with one or more drive letters that the client machines use to access the file servers 208, 210, 212. It should be appreciated that the storage manager is not limited to use with network storage devices that comprise NAS units and SANs, but could also be used to manage other types of network storage devices, such as storage area networks and RAID systems or other storage systems known to those of skill in the art. Each file server 208, 210, 212 includes multiple disk drive storage units 214 (indicated only in the first unit 208 for simplicity of illustration). A computer network 216 communicatively connects the client machines 202, 204, 206 and the file servers 208, 210, 212.

The system 200 includes a distributed storage manager system 220 that has access to communication signals that travel between the client machines 202, 204, 206 and the file servers 208, 210, 212. The storage manager system 220 accesses the signals at a data traffic point in the computer network 216 through which the data signals travel, such as at a switch 225. For clarity of illustration, FIG. 2 shows the storage manager system 220 as being outside of the network 216, although the storage manager system 220 could be a part of the network 216.

FIG. 2 shows the distributed storage manager system 220 as having four machines 222, 224, 226, 228 (also referred to as nodes), but it should be understood that a lesser or greater number of machines also could be provided to comprise the storage manager system 220. Moreover, the four machines together collectively operate as a "storage manager system", but it should be understood that each of the machines 222, 224, 226, 228 also constitutes a fully functional storage manager system of its own and the machines may sometimes be referred to herein as "storage managers". Each of the four machines, 222, 224, 226, 228 is configured to perform the functionality of the storage manager system 220 as described herein. The machines are sometimes referred to herein as "computers."

The use of multiple machines in the storage manager system 220 provides for fail-over security should one of the machines fail. The machines are configured to share state information so that at least one of the machines can take over the duties of a machine that has failed. References to "cluster" in connection with the storage manager system will be understood to refer to the storage manager machines 222, 224, 226, 228 collectively, as a group, rather than individually.

The storage manager system 220 enables the data to be moved among the file servers 208, 210, 212 without disabling the access of the client machines 202, 204, 206 to the data. The storage manager system 220 can move data between the file servers, or can move data from an existing file server to a new file server, while making the data movement transparent to the client machines 202, 204, 206. This is accomplished through the use of links that link an address that a client machine uses to access data in the file servers to a location on the file servers where the data is actually stored, as described in more detail below.

Each of the distributed storage managers 222, 224, 226, 228 operates to provide a resilient network connection in which a file mapping between the client machines 202, 204, 206 and the file servers 208, 210, 212 can be moved among the storage manager machines 222, 224, 226, 228 without complicated configuration processing that would otherwise typically be necessary. This is achieved by maintaining a pool of virtual IP (VIP) addresses that can be dynamically assigned among the storage manager machines comprising the storage manager system. Thus, as described further below, if one of the storage manager machines goes into a failure mode, its place in the cluster (its VIP assignment) and functionality in the storage manager system will be moved to one or more of the other machines in the cluster so as to make the failure transparent to the client/application server machines and the NAS units.

2. System Software Components

Figure 3:
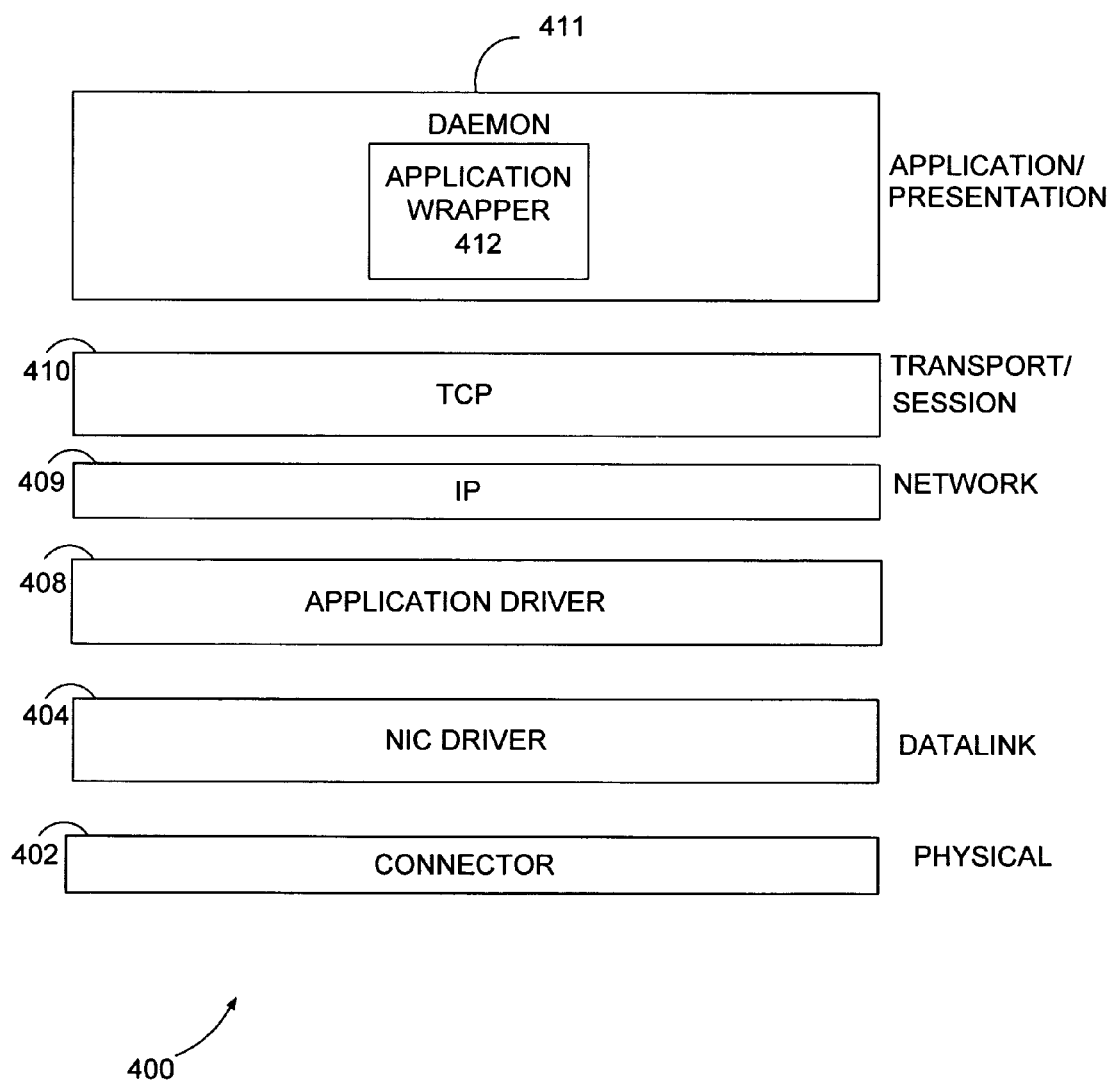
FIG. 3 is a representation of a storage manager computer in the distributed storage manager of FIG. 2, illustrating the OSI networking model components of the computer constructed in accordance with the present invention.

FIG. 3 is a representation of a storage manager machine or computer 222, 224, 226, 228 of the storage manager system in FIG. 2, illustrating the architecture 400 of the storage manager constructed in accordance with the present invention. Those skilled in the art will understand that FIG. 3 is an architecture representation in terms of the Open Systems Interconnection (OSI) networking model published by the International Standards Organization.

The lowest level of the system architecture is the Physical layer, Layer 1, where data packets are received at a connection 402 from the network 216, which in the one embodiment comprises an Ethernet peer-to-peer network. Thus, the connection can comprise a conventional network interface card. The next OSI level is the Datalink layer, Layer 2, which packages data bits received from the Physical layer into data frames that are processed by the higher layers. The Datalink layer is responsible for providing an error-free transmission of data frames between computers through the Physical layer. For example, data packets are physically received in the storage manager machine at a network interface card (NIC) of the storage manager from a network connection. FIG. 3 shows the Datalink layer function being performed by a NIC Driver 404, which can be a conventional driver program for processing data traffic received in accordance with the Ethernet protocol, or whatever protocol is used for the associated subnet with which the NIC communicates.

The Network layer (Layer 3) of the OSI system model determines which path data will take from a source computer to a destination computer, and is occupied by the Internet Protocol (IP) in the TCP/IP protocol stack. In FIG. 3, the application driver 408 situates between the Network (IP) layer 409 and the Datalink layer 404. The application driver refers to driver software that supports operation of the machine as a distributed storage manager in accordance with the present invention. The application driver 408 intercepts communication traffic at the IP layer or at the Datalink layer and determines whether the traffic requires processing in accordance with the invention. If such processing is required, then the application driver 408 forwards the communication traffic to a Daemon 411 for processing. The Daemon 411 is located in an Application/Presentation layer, as described below.

The next layer in the OSI model is the Transport layer, which in FIG. 3 is represented by the TCP stack 410. The Transport layer repackages messages so as to avoid errors and ensure data is in the proper sequence. The details of this OSI layer in general, and the TCP/IP functioning in particular, will be well understood by those skilled in the art. In the Application/Presentation layer, the distributed storage manager of the invention includes the Daemon 411 constructed in accordance with the invention. The Daemon 411 can contain an Application Wrapper 412, which comprises software that provides the storage manager functionality in accordance with the present invention. Thus, the Daemon 411 is the software that provides the distributed storage manager functionality in accordance with the invention.

3. Storage Manager Components

Figure 4:
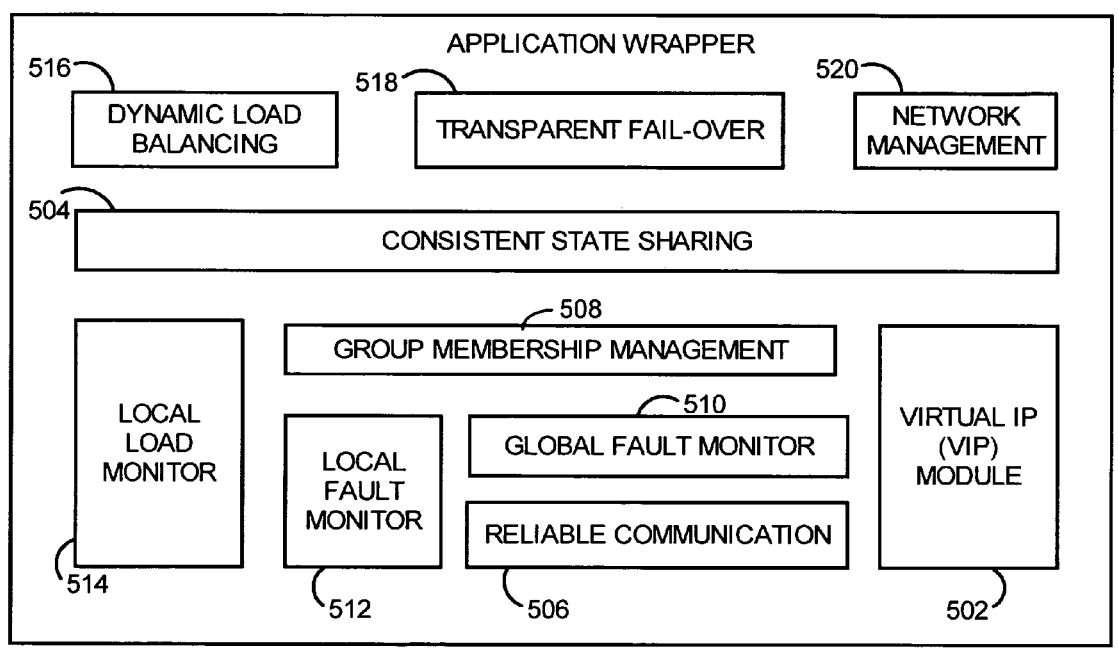
FIG. 4 is a representation of the operational architecture for the Application Wrapper illustrated in FIG. 3.

FIG. 4 shows details of the application wrapper 412 of the Daemon 411 to better illustrate the operational architecture of the distributed storage manager. One process of the Daemon 411 is comprised of the Virtual IP Address module 502, which maintains a virtual-to-primary IP address mapping between primary addresses of the storage manager machines and the virtual IP address pool. Another process comprises a Consistent State Sharing module 504 that permits the storage manager machines to know which machines are functioning and which virtual IP addresses have been assigned to each of the machines. This modules also enables the storage manager machines to share state information. Another process comprises the Reliable Communication module 506 that tracks acknowledgment messages communicated around the storage manager machines, and also helps implement a process comprised of a Group Membership Management module 508. A process comprising a Membership Management module 508 keeps track of the available machines. Network operations are monitored by a process comprised of a Global Fault Monitor module 510, which is complemented by a process comprised of a Local Fault Monitor module 512 for the particular machine on which the Application Wrapper is running.

A process comprised of a Local Load Monitor module 514 determines the data flow rate through the NIC interface in bytes as well as the CPU load to keep track of machine loading. Another process comprised of a Dynamic Load Balancing module 516 ensures that no single storage manager machine becomes overloaded. It does this by moving virtual IP address assignments, if necessary, in view of the monitored local loads. A process comprised of a Transparent Fail-Over module 518 ensures that a failed machine is quickly replaced with an alternative machine, thereby providing high availability in a manner that is transparent to users. These functions operate in conjunction with overall processes comprised of Network Management tasks 520 performed by the storage manager software.

4. Computer Construction

Figure 5:
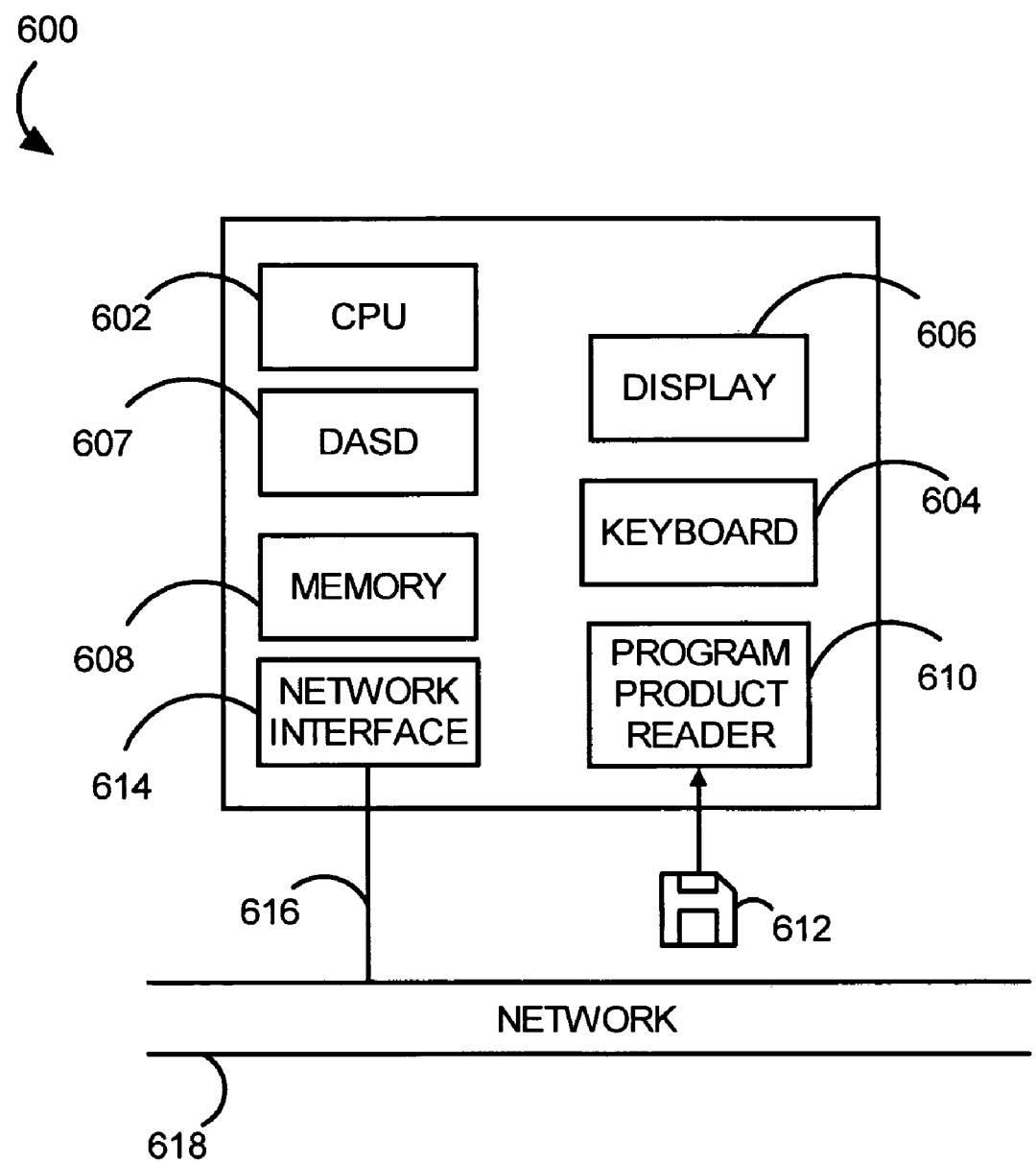
FIG. 5 is a block diagram of a computer that comprises a storage manager machine in the storage manager system of FIG. 2, illustrating the hardware components of the computer.

FIG. 5 is a block diagram of a storage manager computer in the system of FIG. 2, illustrating the hardware components for one of the computers. Those skilled in the art will appreciate that the storage manager computers 222, 224, 226, 228 and the internal host computers can all have a similar computer construction.

FIG. 5 is a block diagram of an exemplary computer 600 such as might comprise any of the computers 222, 224, 226, 228. Each computer 600 operates under control of a central processor unit (CPU) 602, such as a "Pentium" microprocessor and associated integrated circuit chips, available from Intel Corporation of Santa Clara, Calif., USA. A computer user can input commands and data from an optional keyboard 604 and can view inputs and computer output at an optional display 606. If a display is used, the display can comprise a video monitor or flat panel display. The computer 600 also includes a direct access storage device (DASD) 607, such as a hard disk drive. The memory 608 typically comprises volatile semiconductor random access memory (RAM). Each computer may also include a program product reader 610 that accepts a program product storage device 612, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 600 can communicate with the others over a network 618 through a network interface 614 that enables communication over a connection 616 between the network 618 and the computer. The network interface can comprise, for example, a Network Interface Card (NIC) that permits communications over a variety of networks. In the storage manager system 220 (FIG. 2), the network can comprise an Ethernet network or can comprise a connection to the Internet. In the storage manager system 220, the network interface 614 includes two or more physical ports that enable communication with the network 618. The physical ports can each comprise, for example, a one-gigabit Ethernet port. Each of the ports can include a label, such as a "client" label and a "server" label that assist a user in distinguishing the ports.

The CPU 602 operates under control of programming steps that are temporarily stored in the memory 608 of the computer 600. When the programming steps are executed, the distributed storage manager machine performs its functions. Thus, the programming steps implement the functionality of the storage manager system 220. The programming steps can be received from the DASD 607, through the program product storage device 612, or through the network connection 616. The storage drive 610 can receive a program product 612, read programming steps recorded thereon, and transfer the programming steps into the memory 608 for execution by the CPU 602. As noted above, the program product storage device 612 can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 608 over the network 618. In the network method, the computer receives data including program steps into the memory 608 through the network interface 614 after network communication has been established over the network connection 616 by well-known methods that will be understood by those skilled in the art without further explanation. The program steps are then executed by the CPU 602 to implement the processing of the distributed storage manager system 220.

It should be understood that all of the computers 222, 224, 226, 228 of the computer system illustrated in FIG. 2 have a construction similar to that shown in FIG. 5, so that details described with respect to the FIG. 5 computer 600 will be understood to apply to all computers 222, 224, 226, 228 of the system 200. Alternatively, any of the computers 222, 224, 226, 228 can have a different construction, so long as they can communicate with the other computers and support the functionality described herein.

5. Deployment of Storage Manager

Figure 6A:
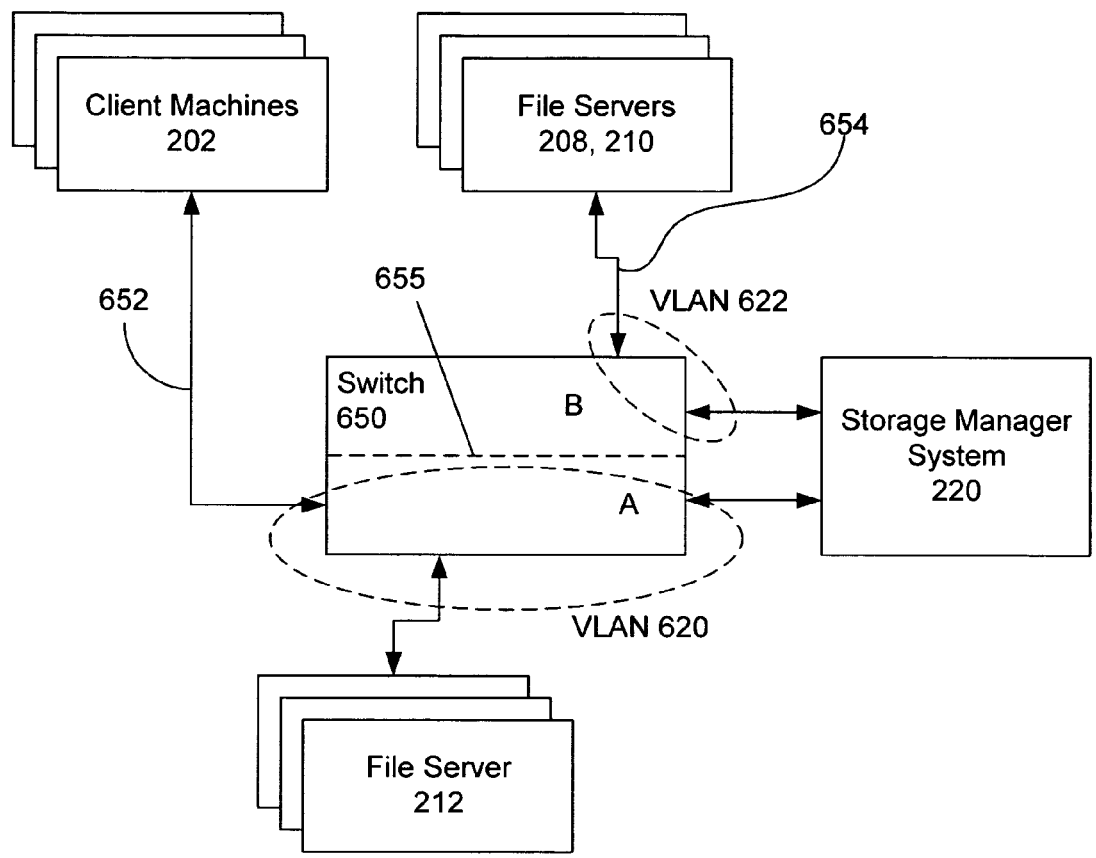
FIGS. 6A and 6B are schematic block diagrams of computer systems constructed in accordance with the present invention to provide a storage manager.
Figure 6B:
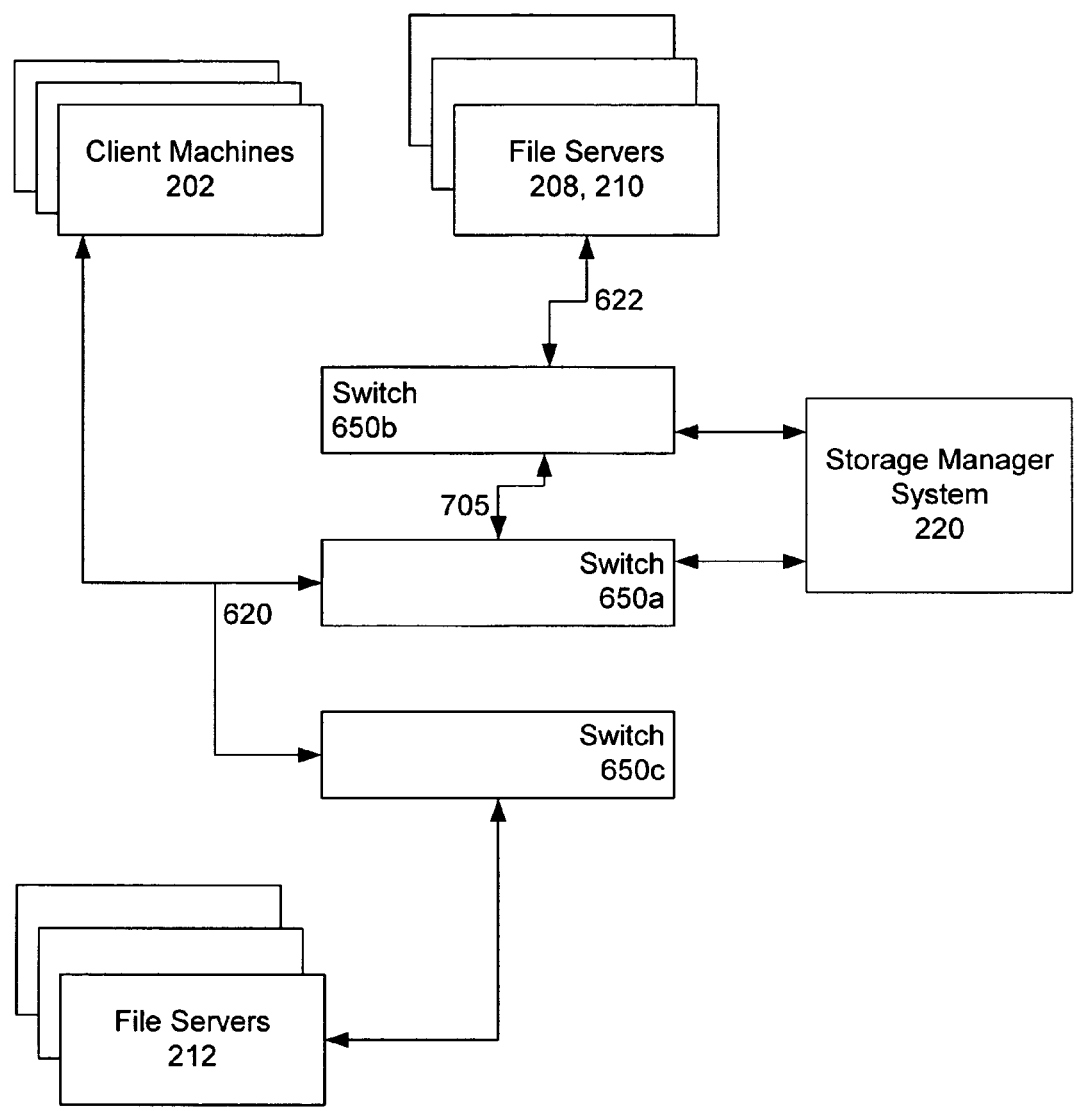

FIGS. 6A and 6B schematically show how the storage manager system 220 can be deployed along a network communication path between client machines 202 and two or more network storage device file servers 208, 210 that are involved in data file movement operations. The storage manager system 220 can be employed according to either of two exemplary configurations or according to other configurations that achieve the processing capabilities described herein. It should be appreciated that the storage manager system 220 can be deployed in other configurations that provide the storage manager system 220 with access to a data path between client machines and file servers affected by a data movement transaction.

FIG. 6A shows a first configuration, referred to as configuration A, that employs a single, partitionable switch and virtual local area networks. FIG. 6B shows a second configuration, referred to as configuration B, that employs two switches. In both configurations, at least one switch is interposed in the network communication path between the client machines 202 and the file servers 208, 210. The storage manager system 220 is communicatively coupled to the switch to thereby provide the storage manager system with access to communications between the client machines 202 and the file servers 208, 210. In one embodiment, the storage manager system 220 is deployed as a bridge device that operates at the Datalink layer (Layer 2) of the communication network architecture pursuant to the Open Systems Interconnection (OSI) networking model published by the International Standards Organization.

With reference to FIG. 6A, in one configuration, a single switch 650 is located in a communication path 652, 654 between the client machines 202 and the file servers 208, 210 that, in this example, are involved in a data movement transaction. The switch 650 can be partitioned into two segments, either as two virtual segments or as two separate physical segments, in a manner known to those of skill in the art. In the case of virtual segments, the switch is partitioned into two or more segments, with each segment being associated with a separate virtual local area network (VLAN). A first VLAN 620 includes the client machines 202 and any file servers 212 that are not affected by a data movement transaction in this example. A second VLAN 622 includes the predetermined set of file servers 208, 210 that are affected by a data movement transaction. For virtual segmenting, the partitioning of the switch can be performed dynamically so that the partitions and VLANs are automatically configured based on the predetermined file servers that are to be affected by the data movement. For physical segmenting, the partitioning can be manually performed. Any switch that can be partitioned into separate virtual segments can be used, and the segmenting and partitioning of the switches, as well as the creation of the VLANs, can be performed according to well-known methods. In this way, the storage manager system 220 can be deployed between the client machines 202 and the file servers 208, 210.

FIG. 6A delineates the segments in the switch 650 using a dashed line 655 that divides the switch 650 into a first virtual segment "A" and a second virtual segment "B". The segment A is associated with a first VLAN 620 that includes the client machines 202, and the segment B is associated with a second VLAN 622 that includes the file servers 208, 210 that are the subjects of a data movement transaction. Thus, the segment A communicates with the first VLAN 620 and the segment B communicates with the second VLAN 622. The VLAN 620 of segment A can also include the file server 212 that, for this example, is not the subject of a data movement transaction. The storage manager system 220 is deployed so that it serves as a bridge between the two segments A, B of the switch 650. With the switch configured in this manner, the storage manager system 220 operates in the communication path between the client machines 202 and the file servers 208, 210 so that communications between the client machines 202 and the file servers 208, 210 pass through the storage manager system 220. As described in more detail below, the storage manager system 220 can also operate in a mode in which it is outside of the data path.

If the switch 650 is not configured to be partitioned into segments, then two separate physical switches 650a, 650b can be employed in a second configuration as shown in FIG. 6B. In this configuration, the storage manager system 220 is deployed as a bridge between the two separate switches 650a, 650b. The switch 650a is connected to the network 620 having a predetermined set of client machines 202 and the switch B is connected to the network 622 having the file servers 208, 210 that are the subject of the exemplary data movement transactions. The servers that are the subject of the data movement transaction are predetermined, so that a system administrator can properly configure the switches 650a, 650b in advance of the data movement transaction. A third switch 650c can be connected to the network 620 and also to one or more file servers 212 that, for this example, are not involved in a data movement transaction.

The storage manager system 220 is easily installed and uninstalled to an existing computer network. If the storage manager system 220 is deployed as a Layer 2 bridge device, then an existing set of client machines and a set of file servers are first connected to a switch device, such as the switch 650 in the configuration shown in FIG. 6A. The switch 650 can be partitioned into separate virtual segments in a well known manner and each segment can be associated with a VLAN. The storage manager system 220 (which can include plural machines) is then communicatively attached to appropriate ports of the switch 650 such that the storage manager system 220 communicatively connects the two virtual segments. Alternately, two separate switches are used to separate the clients and file servers if the switch is not configured to be partitioned, such as shown in FIG. 6B. If two separate switches are used, the switches are directly connected to each other using a separate cable 705, so that the switches can bypass the storage manager system 220 and directly communicate with one another in certain situations, as described more fully below. In the configuration shown in FIG. 6B, the storage manager system 220 can be simply unplugged from the switch or switches to remove it from the network and the communication path. If virtual segments and VLANs are used as shown in FIG. 6A, the storage manager system 220 can be removed by re-segmenting the switch 650 so that one VLAN 620 or the other VLAN 622 includes all of the file servers 208, 210, 212 and the client machines 202.

The storage manager system 220 can also be deployed as a router device that operates at the network layer (Layer 3) of the communication network architecture. In this configuration, the storage manager system 220 connects two separate subnetworks, with the client machines 202 being located on one subnetwork 620 and the file servers 208, 210 (which are involved in the data movement transaction) both being located on common subnetwork 622 that is separate from the subnetwork 620. The storage manager 220 is deployed in place of a router that otherwise be placed between the two subnetworks 620, 622. Thus, the storage manager system 220 functions as a router that connects the two subnetworks 620, 622 to one another. To uninstall the storage manager system, an operator disconnects the storage manager system 220 from the subnetworks and replaces the storage manager system 220 with a standard router device. Advantageously, neither the client machines 202 nor the file servers 208 have to be equipped with any special software or hardware to work with the storage manager system 220.

6. Modes of Operation

As mentioned above, the storage manager system 220 operates in at least two different modes. A first mode is the "out-of-path" mode, wherein the storage manager system 220 operates completely out of the data path between the client machines 202 and the file servers 208, 210. The data path is the path that communications travel between the client machines and the file servers. Those skilled in the art will recognize that communications are typically in the form of data packets. A second mode of operation is the "in-path" mode, wherein the storage manager system 220 has access to and is located within the data path between the client machines 202 and the file servers 208, 210. The storage manager 220 switches to the in-path mode when data is being moved between the file servers 208, 210, as described in detail below, and otherwise operates out of the data path. The in-path mode is sometimes referred to herein as the "in-band" mode and the out-of-path mode is sometimes referred to herein as the "out of band" mode.

Figure 7A:
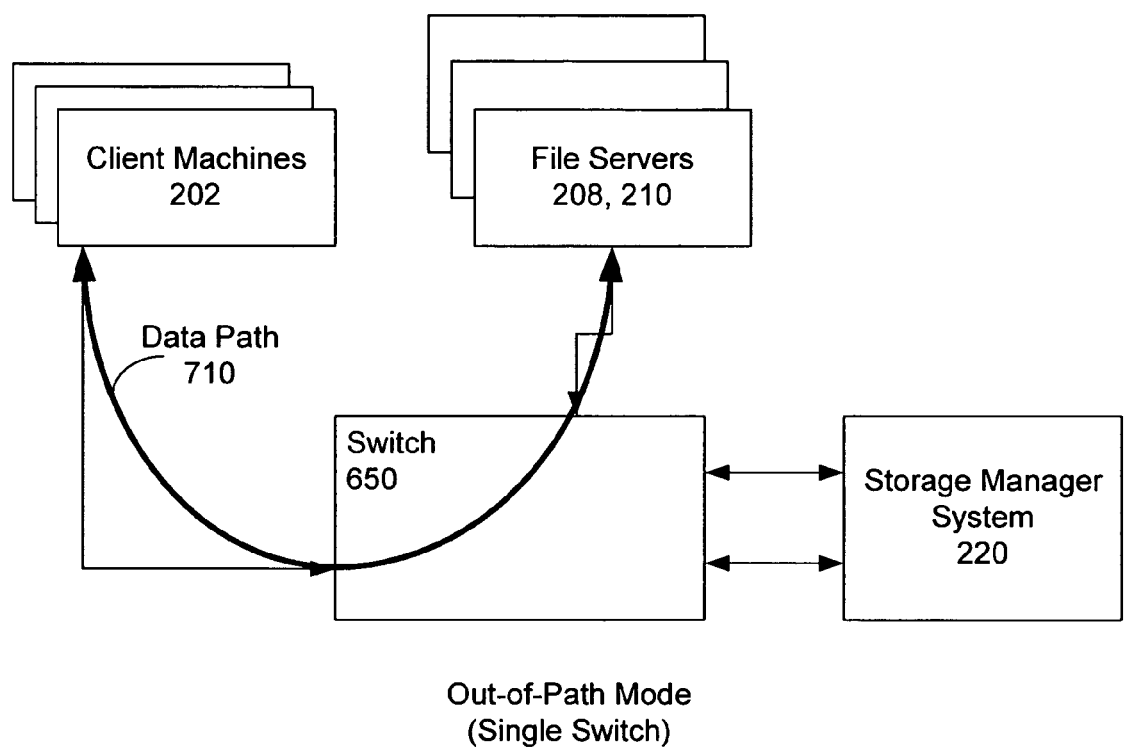
FIGS. 7A and 7B are schematic block diagrams of computer systems showing a data path where the storage manager is in an out-of-path mode of operation.

The out-of-path mode is described with reference to FIGS. 7A and 7B, which show a data path 710 through which communications, including data access requests and data, are transmitted between the client machines 202 and the file servers 208, 210. In the out-of-path mode, the storage manager system 220 operates completely out of the data path 710. FIG. 7A shows the out-of-path mode where a single, partitionable switch 650 is used. In the out-of-path mode, the switch 650 operates as a single segment without the virtual partitioning that was discussed above. Thus, the data path 710 passes through the switch and bypasses the storage manager system 220. That is, data intended for a network client 202 or file server 208, 210 will not pass through the storage manager 220.

Figure 7B:
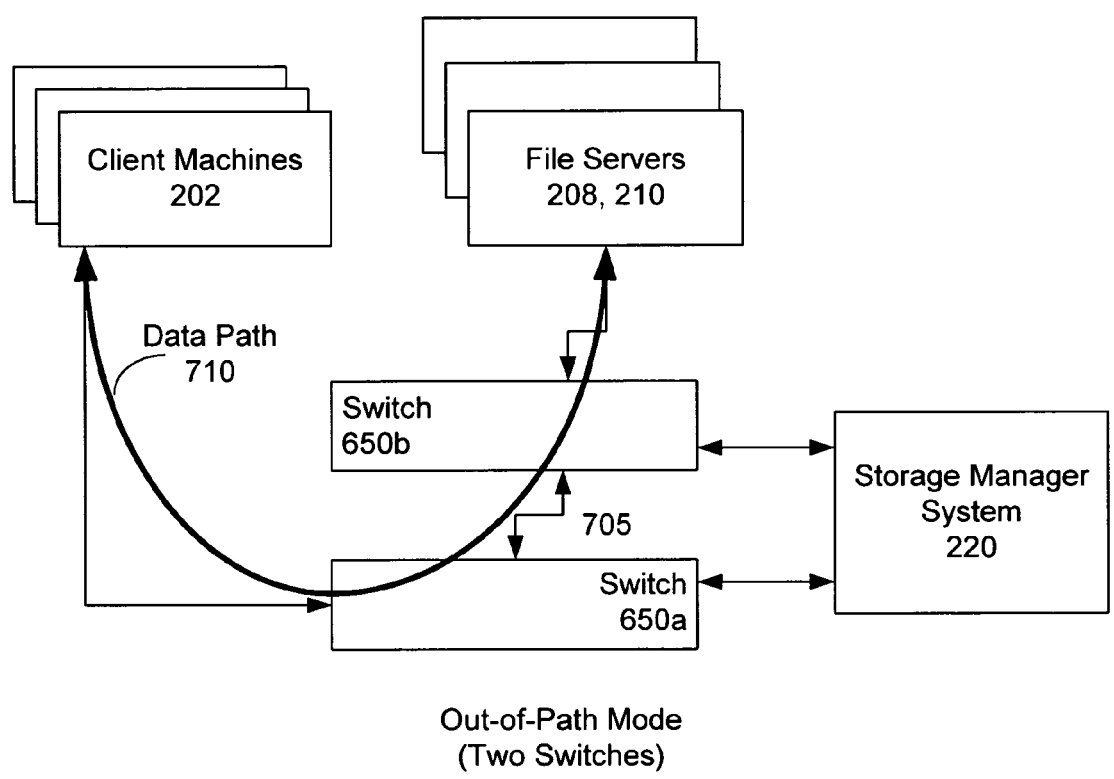

FIG. 7B shows the out-of-path mode where a pair of switches 650a, 650b are employed with the storage manager 220. In this configuration, a cable 705, or the like, communicatively connects the switches 650a and 650b. The data path 710 passes through the switches 650a, 650b (via the cable 705) and bypasses the storage manager system 220.

For both the configuration shown in FIG. 7A and the configuration shown in FIG. 7B, it should be appreciated that although the storage manager system 220 is outside of the data path 710, the client machines 202 and the file servers 208, 210 can still direct specific communications to the storage manager system 220 via the switch 650 or the switches 650a, 650b via their respective connections to the storage manager 220. Thus, a human system administrator can issue instructions to the storage manager system 220 using the client machines 202. In the out-of-path mode, because data traffic does not pass through the storage manager 220, the storage manager 220 produces zero effect in latency relating to communications between the clients 202 and the file servers 208, 210, and also produces zero effect on the throughput of the data infrastructure. For greater efficiency, the storage manager system 220 can default to the out-of-path mode when it is not conducting a data movement transaction, as described more fully below.

Figure 8A:
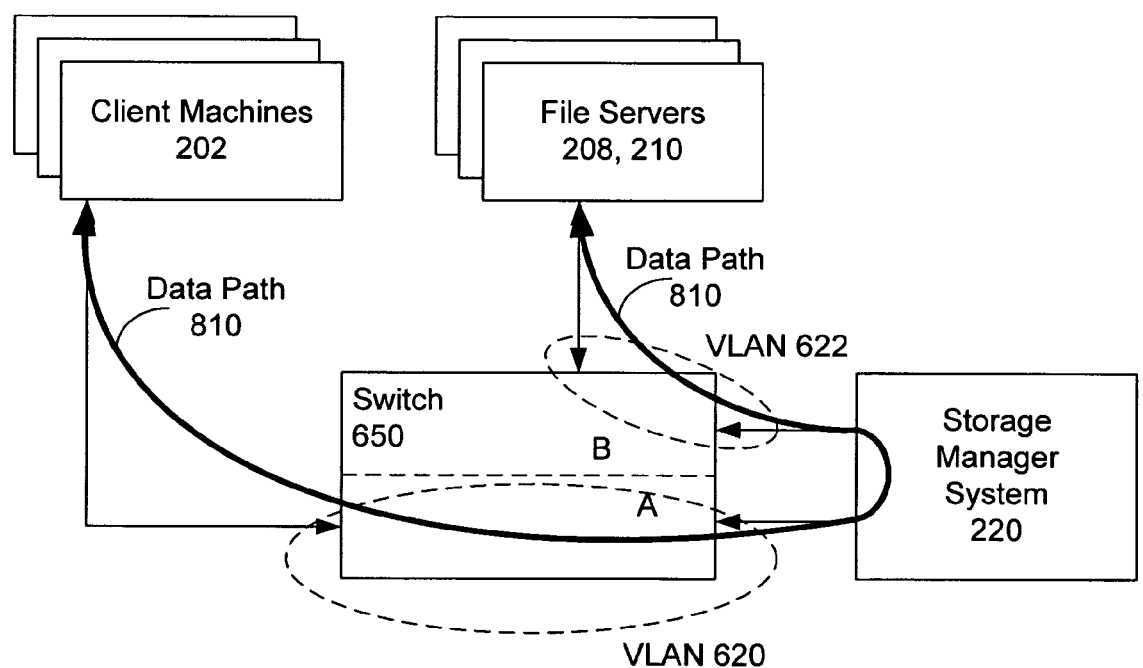
FIGS. 8A and 8B are schematic block diagrams of computer systems showing a data path where the storage manager is in an in-path mode of operation.

The in-path mode is described with reference to FIGS. 8A and 8B, which show a data path 810 through which communications, such as data access requests and data, are transmitted between the client machines 202 and the file servers 208. In the in-path mode, the switch 650 routes the data path 810 through the storage manager system 220. FIG. 8A shows a configuration where a single, partitionable switch 650 is used. In the in-path mode, the switch 650 is partitioned into two virtual segments A and B with the storage manager system 220 communicatively connecting the segments A and B. The segment A is associated with a first VLAN 620 that includes a switch port that communicates with the client machines 202 and a switch port that communicates with the storage manager system 220. The segment B is associated with a second VLAN 622 that includes a switch port that communicate with the file servers 208, 210 and a switch port that communicates with the storage manager system 220. The storage manager system 220 communicatively connects the segments A and B so that the data path 810 passes through the storage manager system 220. Thus, data traffic between the clients 202 and the file servers 208, 210 will pass through the storage manager 220.

The storage manager system 220 can cause the switch 650 to configure itself into two partitions by issuing commands to the VLAN support software of the switch 650 in accordance with well-known methods, such as by using a script that is defined by the system administrator, as described more fully below. The switch configuration control scheme can be different for different switches. The storage manager system 220 can also issue commands to cause the switch 650 to remove the partition. In this regard, the switch 650 or the storage manager system 220 can be loaded with an interface driver that enables the devices to communicate with one another.

Figure 8B:
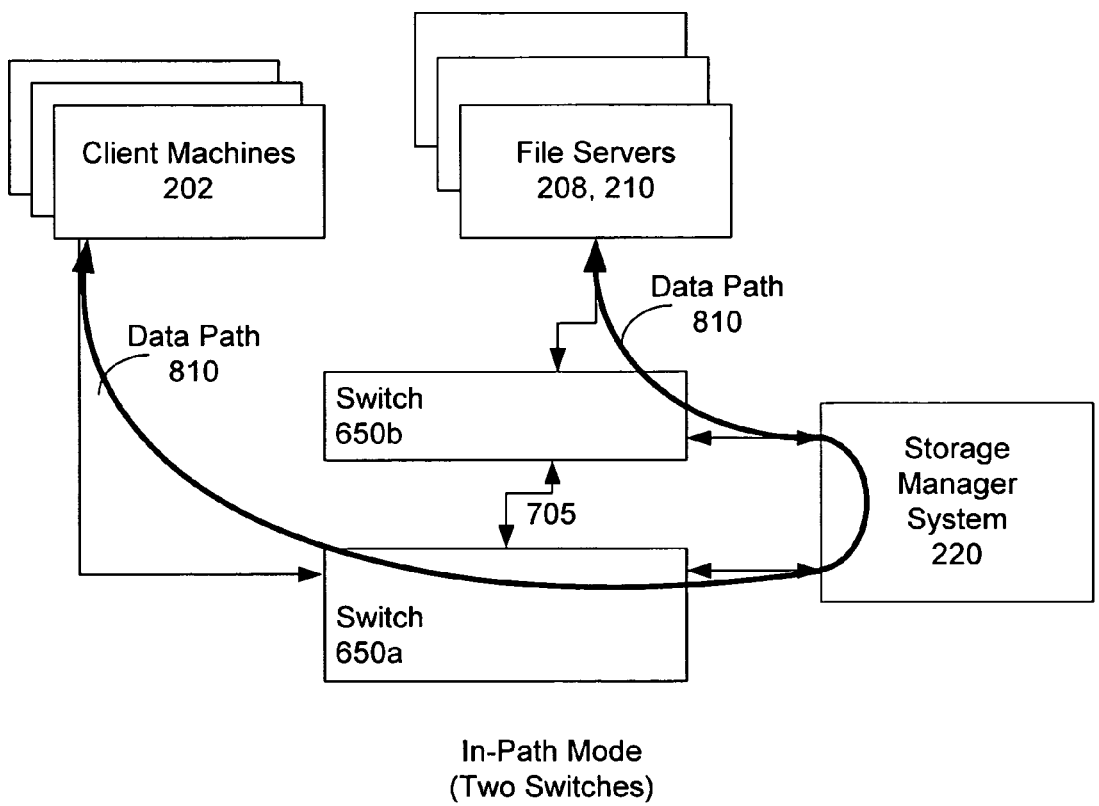

FIG. 8B shows the in-path mode where a pair of switches 650a and 650b are employed. In this configuration, the data path 810 between the switches 650a and 650b is routed through the storage manager system 220 rather than through the cable 705 that directly connects the switches 650a and 650b. This can be accomplished by the storage manager system 220 sending one or more Address Resolution Protocol (ARP) messages to the client machines 202 and the file servers 208, 210 to cause the machines to send all data storage communications to the switch ports associated with the storage manager system 220. In this manner, the storage manager system 220 intercepts all data storage communications between the file servers 208, 210 and the client machines 202. The storage manager system 220 can return the system to the out-of-path mode by sending ARP messages that cause the machines to send their data storage communications to the switch ports associated with the cable 705 to thereby bypass the storage system manager 220. The in-path operational mode permits the storage manager system 220 to monitor or intercept any communications that occur between the client machines 202 and the file servers 208, 210.

In another configuration, the data path always physically passes through the storage manager system 220 regardless of whether the system is in the in-path mode or in the out-of-path mode. In this configuration, the storage manager system 220 ignores all communications that pass over the data path when the storage manager system 220 is operating in the out-of-path mode in terms of message processing. Thus, although the storage manager system 220 is physically in-path, it effectively operates out-of-path because it ignores the messages and has no effect on the messages themselves, although the latency and throughput of the network may be effected. The storage manager system 220 can switch to the in-path mode, wherein the storage manager system 220 intercepts and reviews communications between the client machines 202 and the file servers 208, 210. In this configuration, the storage manager system 220 operates as depicted in FIGS. 8A and 8B.

7. Graphical User Interface

The storage manager 220 can provide a graphical user interface (GUI) through which the system administrator can submit parameters that define the client machines and file servers that are managed by the storage manager 220, as well as parameters that configure the in-path and out-of-path modes. Exemplary screen shots for a storage manager GUI are shown and described herein, although it should be appreciated that the user interface can vary from that shown. The system administrator can access the storage manager GUI using a client machine 202 or a machine that is coupled to the storage manager system 220. The GUI displays can be shown on the machine display 606 (FIG. 5) on which the storage manager software is installed.

Figure 9:
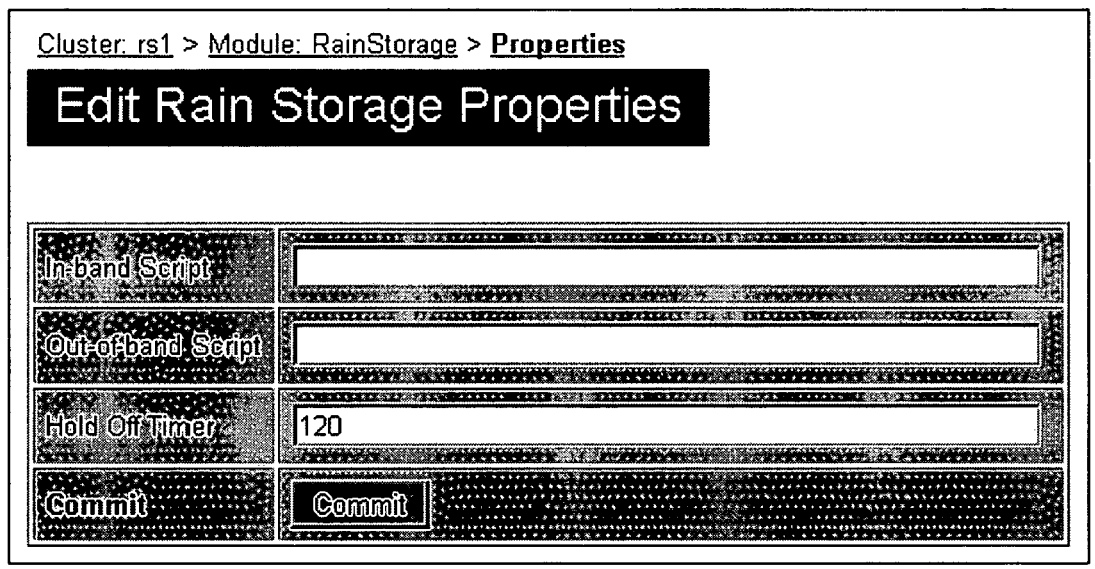
FIG. 9 shows a screen shot of a display page from an exemplary GUI through which a system administrator can define the switch configuration scripts and a hold-off timer.

The storage manager GUI includes an interface through which the system administrator can define parameters that govern the switching between in-band and out-of-band modes. The parameters include, for example, an in-band script, an out-of-band script, and a hold-off timer value. The in-band script is a script that the storage manager 220 uses to automatically reconfigure the switch 650 into the in-path mode. The out-of-band script is a script that the storage manager 220 uses to automatically reconfigure the switch 650 into the out-of-path mode. The particular scripts that are used to configure the switch can be different for different switches. For example, the scripts can vary based on the manufacturer of the switch. The hold-off timer is a time value that specifies how long the storage manager 220 must be in-path before the storage manager commences a data movement transaction, which can be used in situations where a switch re-configuration takes a period of time to settle down. The hold-off timer can be defined in any time unit, such as in seconds. FIG. 9 shows a screen shot of a display page from an exemplary GUI through which the system administrator can define the scripts and hold-off timer.

The storage manager GUI also includes an interface through which the system administrator can define the file servers 208 that are managed by the storage manager 220. The system administrator uses the interface to define parameters for each file server, including a file server name and one or more network addresses (such as IP addresses) for the file server.

Figure 10:
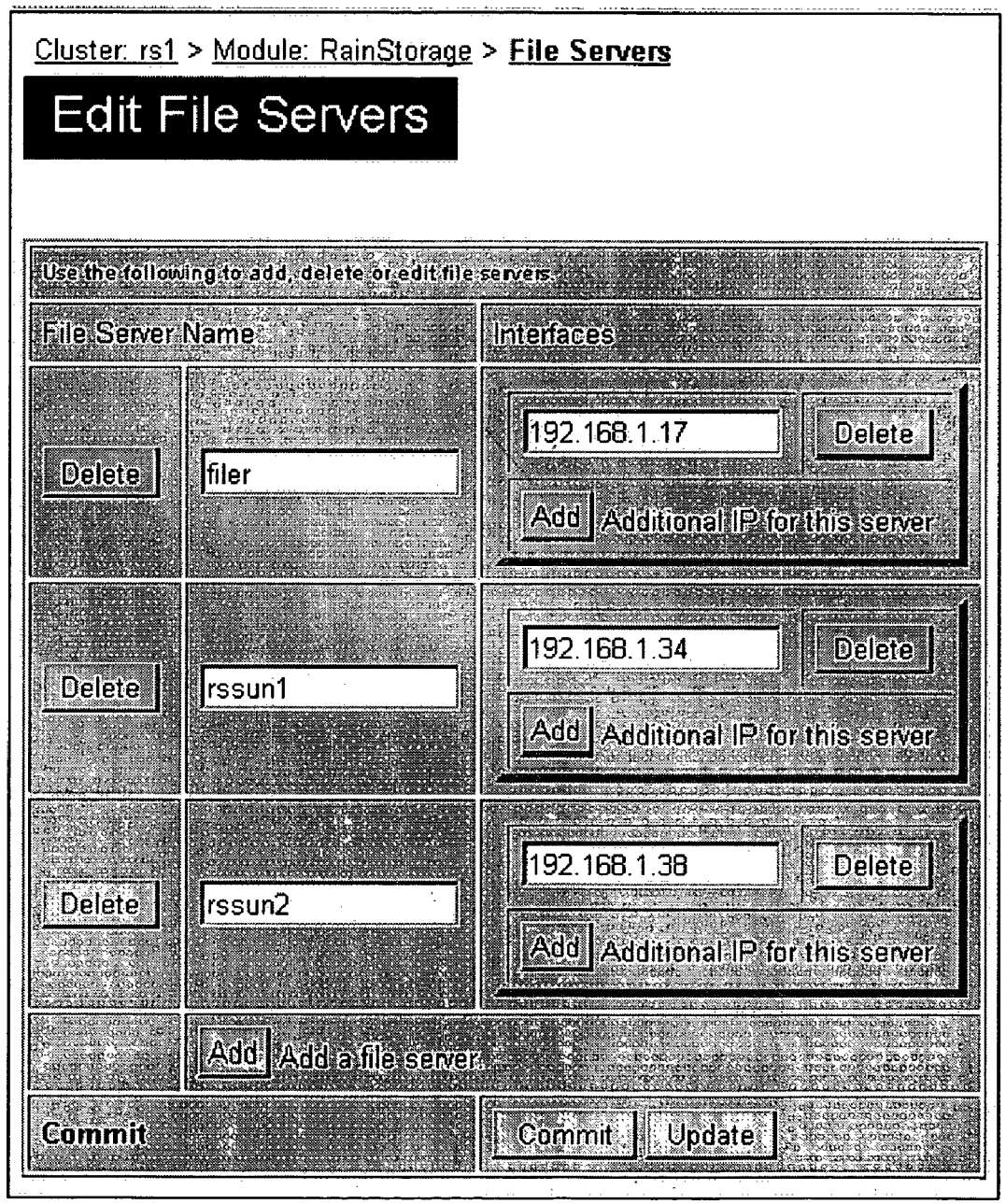
FIG. 10 shows a screen shot of a display page from an exemplary GUI through which the system administrator can define the file servers managed by the storage manager.

FIG. 10 shows a screen shot of a display page from an exemplary GUI through which the system administrator can define the file servers managed by the storage manager 220.

The GUI also provides an interface that provides status information for each file server managed by the storage manager 220. The status information can include, for example, a listing of data files and directories that have been moved to or from the file server, available storage space for the file server, and the total storage size of the file server.

FIG. 11 shows a screen shot of a display page from an exemplary GUI that provides file server status information.

Figure 12:
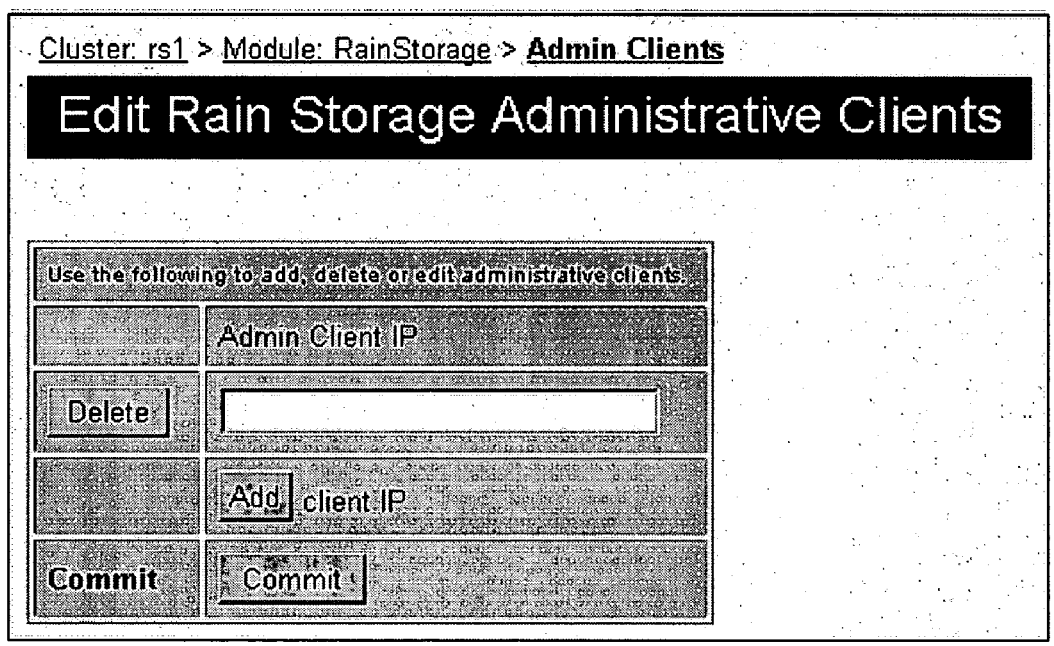
FIG. 12 shows a screen shot of a display page from an exemplary GUI through which the system administrator can define the client machines for the storage manager.

In addition, the storage manager GUI provides an interface through which the system administrator can define the client machines that are managed by the storage manager 220. The system administrator can define client machines that are managed by the system manager 220, as well as client machines that will be ignored by the system manager 220 such that data access requests from "ignored" client machines are not managed by the storage manager 220. The client machines 202 can be identified using a network address, such as an IP address. FIG. 12 shows a screen shot of a display page from an exemplary GUI through which the system administrator can define the client machines for the storage manager 220.

8. Data Movement Transaction

Figure 13:
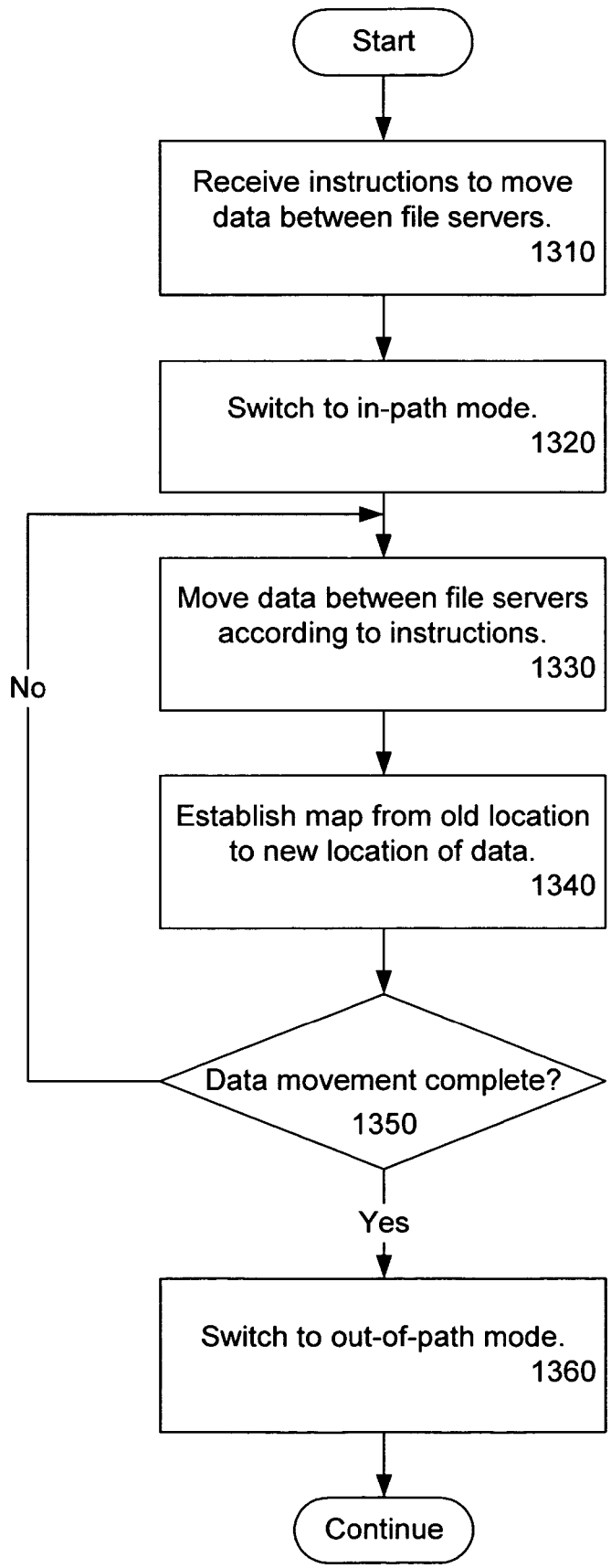
FIG. 13 is a flow diagram that shows the operations performed by the storage manager during a data movement transaction.

FIG. 13 is a flow diagram that describes the operations performed during the movement of data between the file servers 208. The movement of data between the file servers 208 might be necessary or desirable in response to a variety of conditions. For example, one of the file servers 208 can be at or near full data storage capacity, thereby requiring that data be moved from the file server that is full to another file server that has available space. Another situation where data might need to be moved is where a file server is being replaced. In such a situation, the data on the file server that is being replaced will need to be moved to a new file server. Yet another situation is where the data storage distribution among a collection of file servers is being re-balanced in order to optimize performance. It should be appreciated that the aforementioned conditions and situations are just some examples where data might need to be moved between file servers, and that data can be moved between file servers in a variety of other situations.

The operations of the flow diagram of FIG. 13 are sometimes described with reference to FIG. 17, which shows a system that initially includes client machines 202, file servers 208, 210, a switch 650, and a storage manager system 220. The file servers 208, 210 include storage units that store a collection of data, including a data file 1710, which is initially stored on the file server 210. It should be appreciated that the storage manager system is initially operating in the out-of-path mode.

In the first operation, represented by the flow diagram box numbered 1310, the storage manager system 220 receives instructions to move data between two of the file servers 208, 210, such as to move data from one file server to another existing file server or to move data from an existing file server to a newly-installed file server. For example, with reference to FIG. 17, the instructions might be to move the data file 1710 from the file server 210 to a newly-installed file server 212, which is shown in FIG. 18. A system administrator can initiate the move by providing instructions using a file manager user interface software program that resides on one of the client machines 202 and that interfaces with the storage manager system 220. The operator uses the user interface to provide information relating to the data movement transaction, such as the names and locations of files to be moved and the location to which the file is to be moved. The operator can also provide a time at which the move should commence. The movement instructions can relate to any number of files or directory structures. Thus, the operator can instruct that a single file be moved, a group of files be moved, or a group of file directories and associated files be moved. The move can also be automatically initiated by the storage manager 220 in response to certain criteria being satisfied, such as where a file server data storage load has reached a predetermined threshold.

Figure 14:
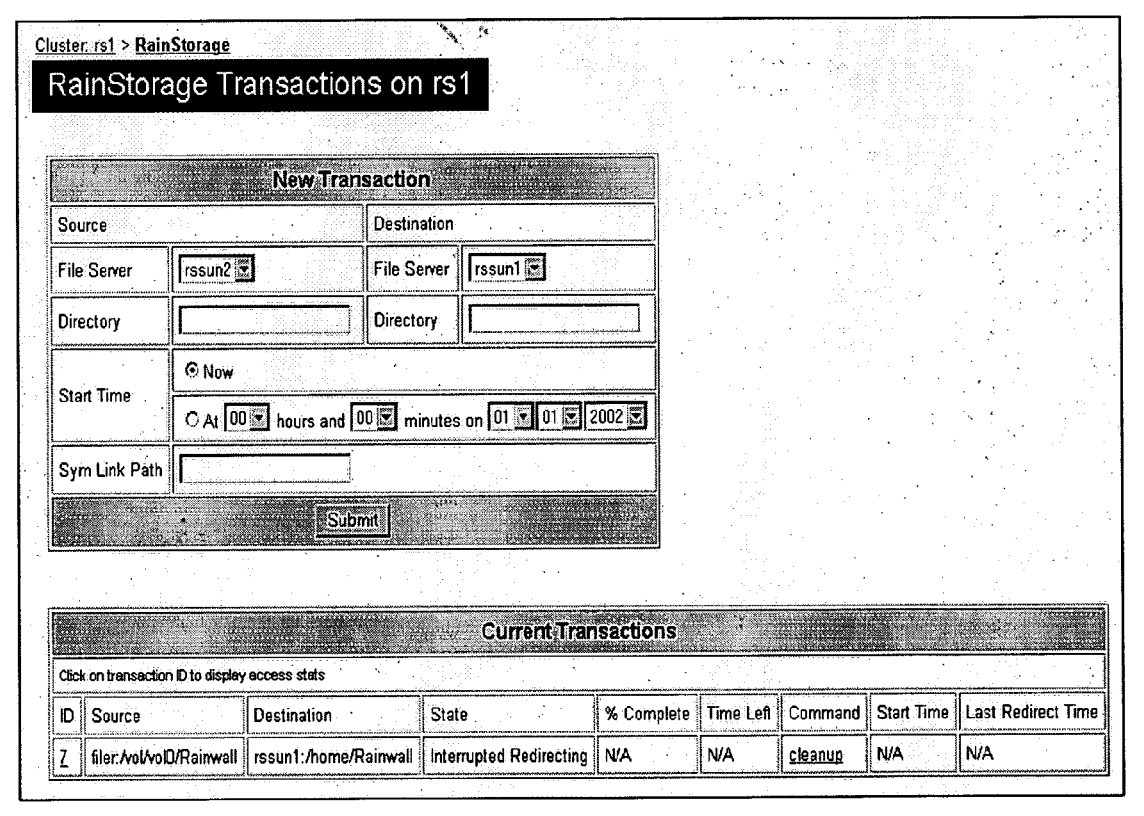

In one configuration, the storage manager 220 provides a GUI through which the system administrator can define a data movement transaction. The GUI can enable the system administrator to define a file server name and a data location (such as directory location) for the source file server, as well as a file server name and a data location for the destination file server that are the subject of the data movement transaction. In addition, the GUI enables the system administrator to specify a start time for the transaction or to specify whether the transaction should start immediately. The GUI also enables the system administrator to specify a symbolic link path that links the source location to the destination location of the data file(s) that are moved, as described more fully below. FIG. 14 shows a screen shot of a display page from an exemplary GUI through which the system administrator can define a data movement transaction.

With reference again to FIG. 13, in the next operation of a data movement transaction, represented by the flow diagram box numbered 1320, the storage manager system 220 switches from the out-of-path mode to the in-path mode in the manner discussed above. The mode switching can occur automatically when the storage manager system 220 receives the instructions from the user interface program on a client machine. Thus, the system 220 can respond dynamically to user commands in real time. The mode switch can also be configured to automatically occur at a certain time as specified by the operator. As discussed above, the storage manager system 220 has access to all communications between the client machines and the file servers when the storage manager system 220 is in the in-path mode.

Figure 15A:
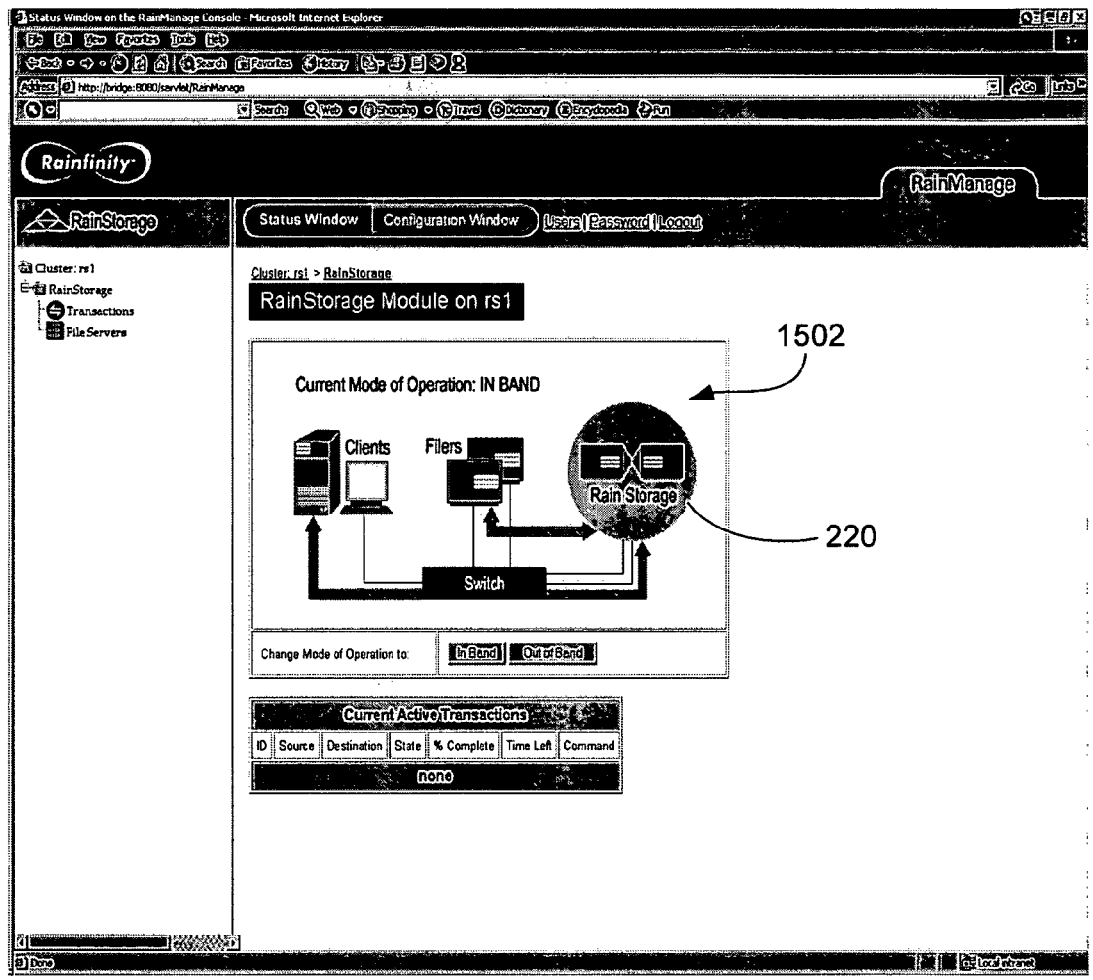
FIGS. 15A and 15B show screen shots of a status display page that provides a graphical representation of the current operational mode status of the storage manager.
Figure 15B:
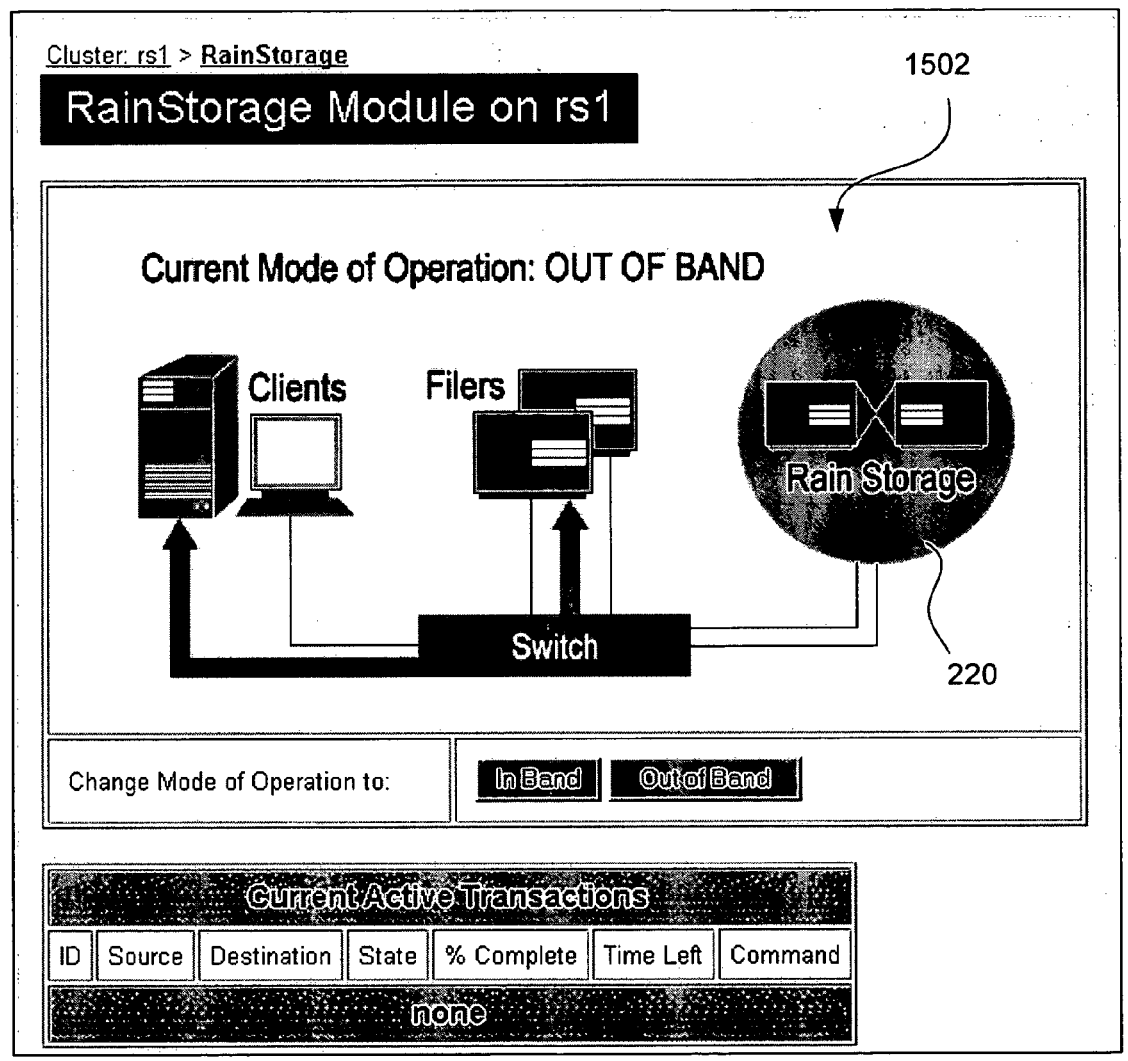

Pursuant to the operational mode switch of the flow diagram box 1320, the GUI of the storage manager 220 includes a status page that provides a graphical representation of the current operational mode status of the storage manager 220. FIGS. 15A and 15B show exemplary screen shots of such a display page, which includes a graphical representation 1502 of the operational mode. In FIG. 15A, the graphical representation 1502 shows the storage manager 220 (which is identified in FIG. 15A as "RainStorage", a product of Rainfinity, Inc. of San Jose, Calif.) in the in-band operational mode. In FIG. 15B, the graphical representation 1502 shows the storage manager 220 in the out-of-band operational mode.

Returning to FIG. 13, in the next operation, the storage manager system 220 begins to physically move the data between the file servers according to the operator instructions, as represented by the flow diagram box numbered 1330. The storage manager system 220 can move the data by issuing instructions to the file servers according to well-known methods. In one embodiment, the storage manager system 220 moves the data on a file-by-file basis. Thus, for example, if three files are to be moved, then the storage manager system 220 moves the first file, and does not start to move the second file until the first file has been moved, and so forth. This allows the storage manager system 220 to interrupt a data movement transaction that involves a large number of data files by flagging the particular data file at which the interruption occurs. The storage manager system 220 can re-start an interrupted data movement transaction by continuing with movement of the data file that was flagged at the point of interruption. Thus, the storage manager system 220 is not required to re-start from scratch an interrupted data movement transaction.

Figure 16:
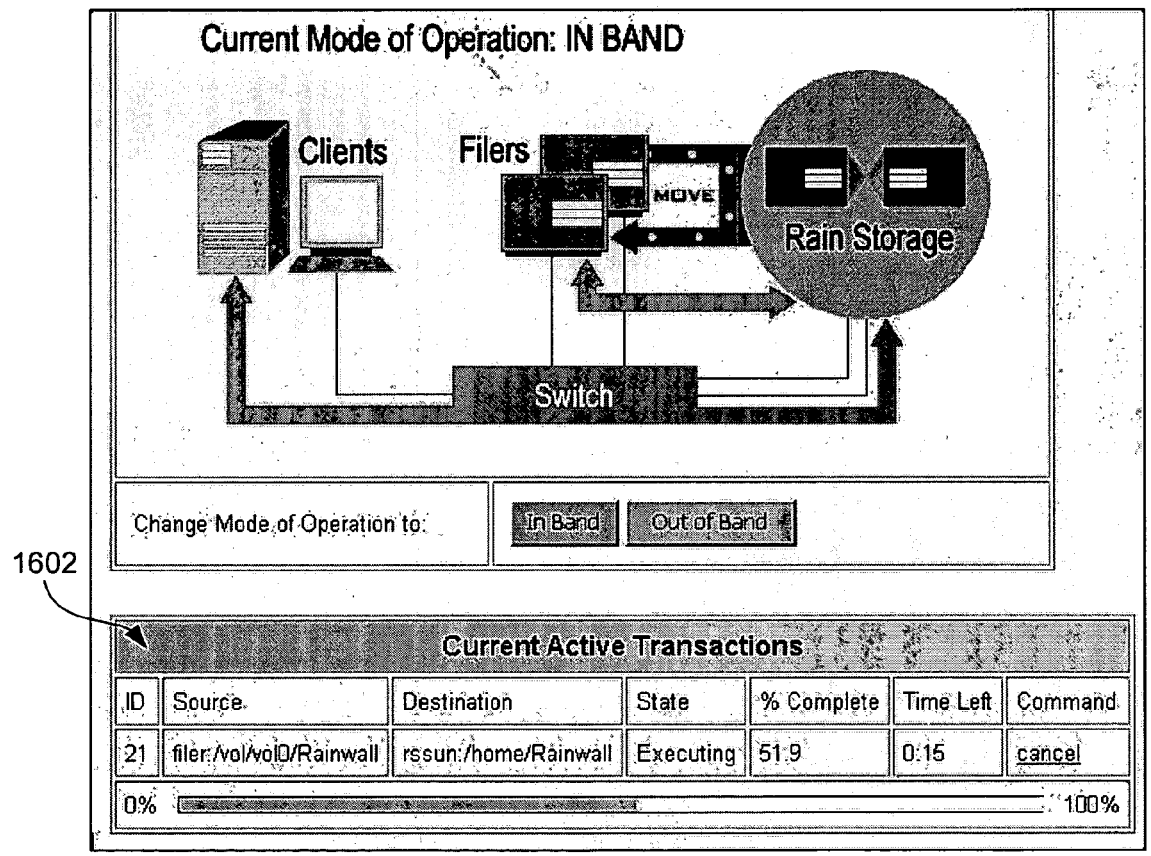
FIG. 16 shows a screen shot of a status page of the storage manager GUI that provides the current status of a data movement transaction.

With reference to FIG. 16, the status page of the storage manager GUI includes a status section 1602 that provides the status of any data movement transaction that is scheduled to occur or is currently in process, such as pursuant to the operation represented by the flow diagram box numbered 1330. The status section 1602 can be in the form of a table that includes a plurality of fields for information regarding a data movement transaction. In the status page shown in FIG. 16, the fields include an "ID" field, a "source" field, a "destination" field, a "state" field, a "percent (%) complete" field, a "time left" field, and a "command" field. The ID field provides an identification number for the transaction. The source field identifies the source network location, such as in the form of a file server ID and directory location, for the data files that are the subject of the data movement transaction. The destination field identifies the destination network location for the data files that are the subject of the data movement transaction. The state field provides an indication of the current state of the transaction. In one embodiment, the transaction can be in at least any of the following states:

1. Pending—the "pending" state indicates that the transaction is scheduled but has not yet begun.
2. Preparing—the "preparing" state indicates that the storage manager is about to begin the transaction.

3. Executing—the "executing" state indicates that the storage manager is moving data files pursuant to the transaction.
4. Redirecting—the "redirecting" state indicates that the storage manager has finished moving data files and is currently redirecting client access for the moved data files from the source to the destination location.
5. Failed—the "failed" state indicates that the transaction failed.
6. Cancelled—the "cancelled" state indicates that the system administrator cancelled the transaction.
7. Interrupted Pending—this state indicates that the storage manager failed while the transaction was pending and that the transaction should be resubmitted.
8. Interrupted Executing—this state indicates that the storage manager failed while the transaction was executing and that the transaction should be resubmitted.
9. Interrupted Redirecting—this state indicates that the storage manager failed while the transaction was in the redirecting state and that the transaction should be resubmitted.

Returning to FIG. 13, the next operation of the data movement process is represented by the flow diagram box numbered 1340. For a data file that was moved, the storage manager system 220 automatically establishes a map from the previous storage location of the data file to the new storage location of the data file. According to the map, a client data access request that refers to the original file location is automatically redirected to the new file location without requiring any additional action on the part of the client machine making the request. Thus, the map allows the client machines 202 to continue to access the moved data file using the original data file pathname that specifies the old location of the data file, thereby making the data move transparent to the client machines. A data file pathname is a sequence of symbols or input commands (such as keyboard or mouse inputs) that identify the name and location of a data file. Typically, a data file pathname includes a drive letter followed by a directory specification and a file pathname, such as D:\home\datafile.

Figure 17:
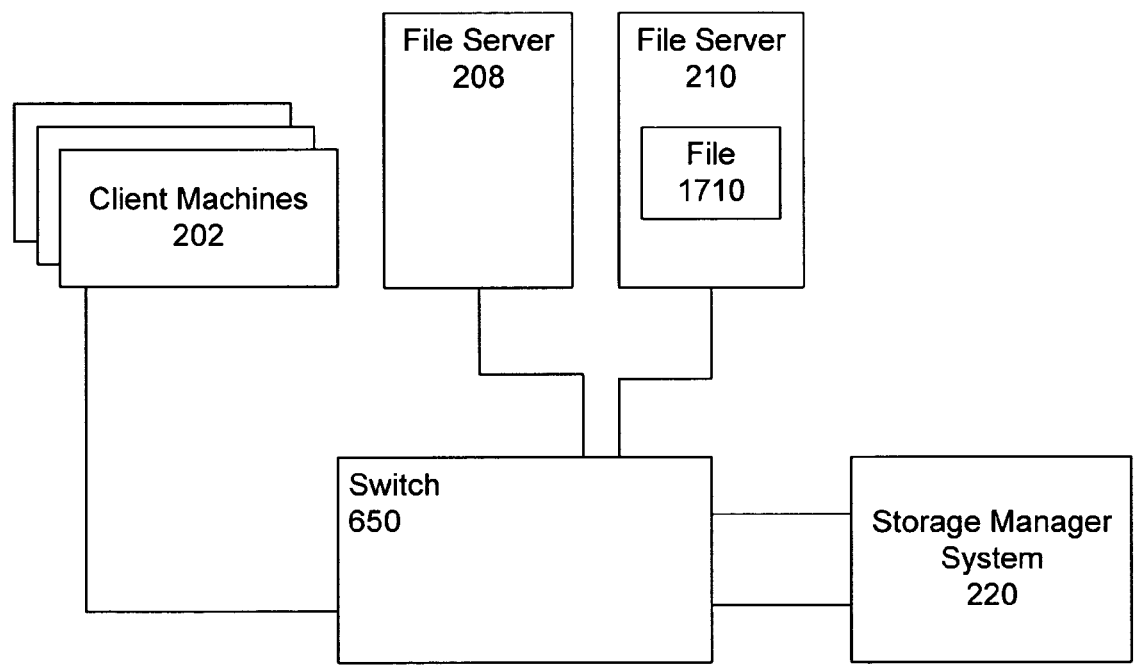
FIG. 17 is a schematic block diagram of a computer system in which a data movement transaction is performed pursuant to the processing shown in FIG. 13.
Figure 18:
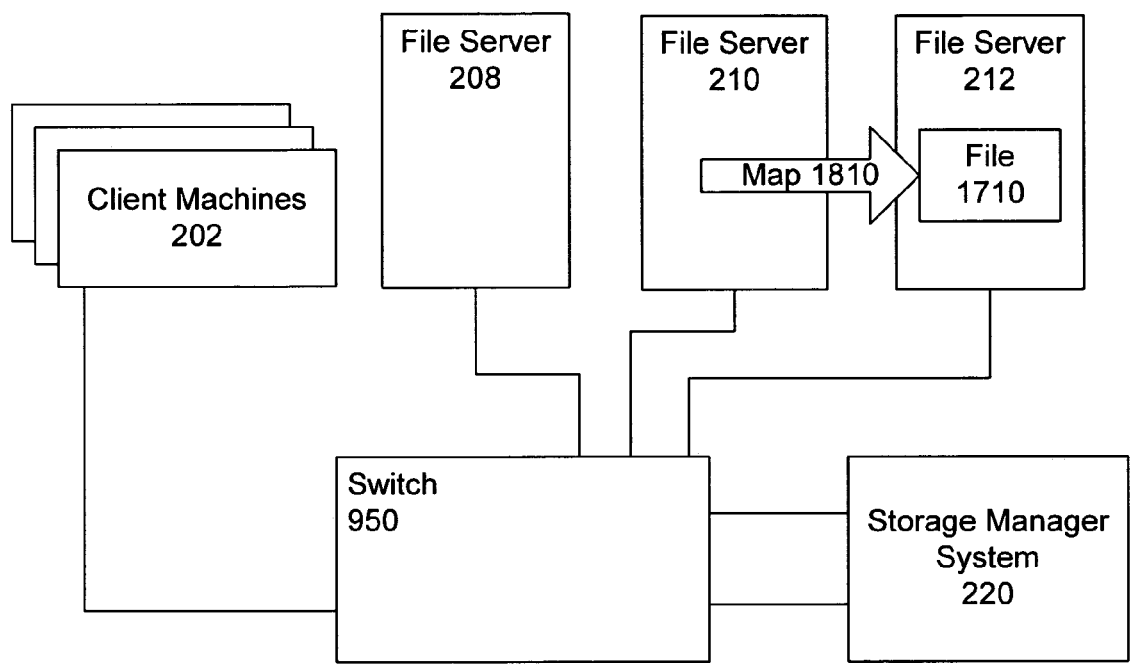
FIG. 18 is a schematic block diagram of a computer system in which a data movement transaction has been performed pursuant to the processing shown in FIG. 13.

For example, as shown in FIG. 17, the client machines 202 can have accessed the data file 1710 using the pathname "D:\home\datafile", which is associated with the file server 210. As shown in FIG. 18, the storage manager system 220 then moves the data file 1710 to a new file server 212 per operator instructions. Pursuant to the operations of flow diagram box 1340, the storage manager system 220 creates a map from the old location of the data file 1710 in file server 210 to the new location on file server 212 so that the data movement is transparent to the client machines. This is shown in FIG. 18, which shows a map 1810 that points to the new location of the data file 1710 from the file server 210. The map enables the client machine 202 to still access the data file 1710 using the pathname D:\home\datafile, even though the file 1710 has been moved to a different location.

The operations represented by the flow diagram box 1340 can be implemented in a variety of manners that are well known to those skilled in the art. For example, in a network that operates on the UNIX file system or the Network File System (NFS), a symbolic link can be used to link the old location of the data file to the new location. When the storage manager 220 moves a data file, it places a symbolic link file at the original location of the data file, wherein the symbolic link redirects any data access requests on the old location of the data file so that the data access requests act on the new location of the data file. Thus, once the storage manager 220 places the symbolic link, it will not need to take any additional action in redirecting data access requests for the moved data file. In a CIFS environment, the Distributed File System (DFS) can be used to establish the mapping from the original location of the data file to the new location of the data file. It should be appreciated that other linking systems and methods with analogous artifacts can be used. One skilled in the art will know the details of how to establish and maintain such links.

The next operation is represented by the decision box numbered 1350. In this operation, the storage manager system 220 determines whether the data movement is complete pursuant to the operator instructions. That is, the storage manager system 220 determines whether all of the data files and/or directories have been moved to the locations specified in the instructions. If any data files have not yet been moved, then a "No" results from the decision box 1350 and the process proceeds back to the operation represented by box 1330, where the storage manager system 220 continues to move the data pursuant to the instructions.

If the data movement is complete, then a "Yes" results from the decision box 1350. The process then proceeds to the operation represented by the flow diagram box numbered 1360, where the storage manager system 220 automatically switches back to the out-of-path mode of operation.

9. Collision Avoidance

In accordance with one aspect of the invention, the storage manager system 220 manages the movement of data between the file servers so as to resolve conflicts between two parties (i.e., a client machine and the storage manager system 220) that attempt to access the same data at the same time during data movement. In particular, the storage manager system 220 resolves conflicts where one computer, such as a client machine, attempts to access a data file that is currently being moved by the storage manager system 220. A client machine 202 attempts to access a data file, for example, when the client machine attempts to download, save, or copy the data file. In the event that two parties attempt to access the same data at the same time, the storage manager system 220 resolves the conflicting access attempts according to an access priority scheme. The priority scheme includes rules that define which party is provided access to data in the event that two different parties attempt to access the same data at the same time. The two parties can both be client machines.

Figure 19:
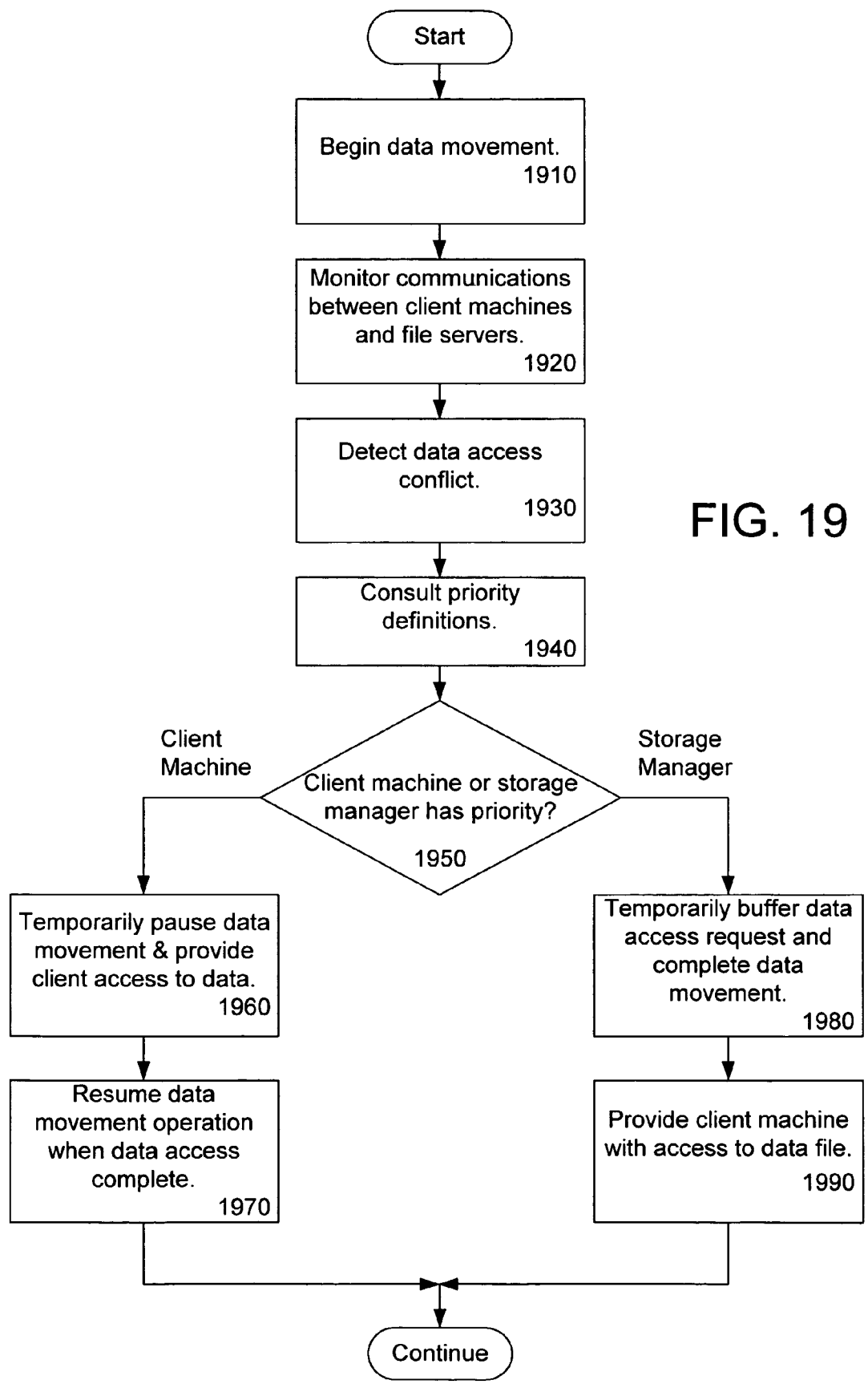
FIG. 19 is a flow diagram that shows the processing performed by the storage manager to resolve data access conflicts during a data movement transaction.

FIG. 19 shows a flow diagram that describes the operations that the storage manager system 220 performs to resolve conflicts relating to data access during a data movement transaction. In the first operation, represented by the flow diagram box numbered 1910, the storage manager system 220 begins a data movement transaction. The operations associated with a data movement transaction were described above with reference to the flow diagram shown in FIG. 13.

In the next operation, represented by the flow diagram box numbered 1920, the storage manager system 220 monitors communications that occur between the client machines 202 and the file servers 208. As discussed above, the storage manager system 220 switches to the in-path mode during a data movement transaction, thereby providing the storage manager system 220 with access to communications between the client machines 202 and the file servers 208. The storage manager system 220 monitors the communications and identifies any communications that relate to data access wherein one of the client machines 202 is attempting to access data located on the file servers 208. In this regard, the storage manager system 220 can be configured to understand and identify communications that conform to protocols that are associated with data storage and access on a computer network. For example, the storage manager system 220 can be configured to understand communications that conform to the Network File System (NFS) and the Common Internet File System (CIFS), as well as other protocols associated with data storage and access over computer networks. If a communication relates to the access of data, then the storage manager system 220 identifies which data files will be accessed, such as by parsing the communication to obtain information that identifies the data files being accessed according to well-known methods.

In the next operation, represented by the flow diagram box numbered 1930 of FIG. 19, the storage manager system 220 detects a data access conflict relating to accessing data on the file servers 208. A data access conflict occurs where one of the client machines 202 submits a data access request wherein the client machine attempts to access a data file that is about to be moved by the storage manager system 220. The storage manager system 220 can maintain a progress log to keep track of which files have been moved, which files need to be moved, and which files are currently being moved during a data movement transaction. The storage manager system can detect a conflict by comparing files identified in a client machine's access requests to the files in the progress log.

It should be appreciated that a data access conflict can also occur with respect to the movement of directory structures, as well as the movement of individual files. A directory structure is a file or node that identifies a group of data files. For example, when the storage manager system 220 is copying a file directory structure from one file server to another file server, a client machine 202 can attempt to create a new directory in the structure or copy new data into an existing directory, which would create a data access conflict.

When the storage manager system 220 detects that a conflict occurs, it then consults a priority definition that will be used to resolve the conflict, as represented by the flow diagram box numbered 1940. The priority definition is stored in memory of each of the storage manager machines and can be shared between the machines using a protocol word, as described below. The conflict is resolved by either granting priority, pursuant to the priority definitions, to either the storage manager system 220 or to the client machine 202 that is attempting to access the data file. If the storage manager 220 has priority, then the storage manager system 220 is allowed to move the data file prior to the client machine 202 being granted access to the file. On the other hand, if the client machine 202 has priority, then the client machine 202 is granted immediate access to the data file.

The priority definition includes rules that define which party is provided access to data in the event of a data conflict. The priority rules can vary. For example, a rule can specify that the storage manager system 220 is always granted priority so that a data movement transaction always has priority over a data access request from a client machine 202. Another rule can specify that the storage manager system 220 only has priority where the data movement transaction will take less than a specified period of time. The rules can also vary the priority of different client machines, such that some client machines have a higher priority than other client machines, or some have some priority over the storage manager system 220 and some do not. In any event, the priority rules define how the data access conflict is resolved. The storage manager system 220 can have a set of default priority rules and can also have a priority rules editor that permits a system administrator to define rules through a user interface on one of the client machines 202.

The next operation varies depending on which party has priority in the data access conflict, as represented by the decision box numbered 1950 of FIG. 19. If the client machine has priority (a "Client Machine" output from the decision box 1950), then the process proceeds to the operation represented by the flow diagram box numbered 1960. In this operation, the storage manager system 220 temporarily pauses any data movement that is occurring with respect to the data file at issue and grants the client machine access to the data file, such as by allowing the client machine to write or read the data file. The pause in the data movement transaction can be on a file-by-file basis such that the storage manager system 220 refrains from moving a particular data file until after the client machine has accessed the data file.

It should be appreciated that the amount of time required to access a data file can differ from the amount of time that the client machine actually has an instance of the file open. A client machine can typically complete a file access operation in a matter of seconds or fractions thereof depending on the size of the data file, while still having an instance of the file open for a much longer amount of time. This is because the client machine accesses the file from a file server by copying an instance of the file into local memory (RAM), which can take less than a second. The client machine does not need to access the file from the file server while the file remains open on the client machine, but rather accesses the file from local memory. When the client machine saves the file, it accesses the file server by copying its local version to the file server. The pause in data movement pursuant to the operation 1960 of FIG. 19 can occur for the amount of time required for the client machine to access the data file on the file server and not for the entire time the client machine has the file open.

In the next operation, the storage manager system 220 resumes the data movement after the client machine's data access is complete, as represented by the flow diagram box numbered 1970 of FIG. 19. That is, after the client machine accesses the data file, the storage manager system 220 completes the data movement transaction by moving the subject data file to its new location.

With reference again to the decision box numbered 1950, if the storage manager system 220 has data access priority (a "Storage Manager" output from the decision box 1950), then the process proceeds to the operation represented by the flow diagram box numbered 1980. In this operation, the storage manager system 220 temporarily buffers the communication from the client machine 202 relating to the data file and then completes the movement of the data file. The storage manager system 220 can store an instance of the communication in local memory to thereby preserve the communication until the data movement is complete.

In the next operation, represented by the flow diagram box numbered 1990 of FIG. 19, the storage manager system 220 provides the client machine 202 with access to the data file by allowing the communication to continue on to its original destination. The storage manager system 220 can then continue with normal operation. Advantageously, the process represented by the flow diagram of FIG. 19 results in a resolution of data access conflicts that can occur during the movement of data between file servers. The resolution is transparent to any client machines that attempt to access data during a data movement transaction.

10. Load Balancing of File Servers

The storage manager system 220 can be configured to monitor and balance loads on the file servers. In one aspect of load balancing, the storage manager system 220 is configured to monitor the amount of data storage space available on the storage units of the file servers that are managed by the storage manager system 220. The storage manager system 220 can keep track of the available space by issuing native NFS or CIFS calls to the file servers according to well-known methods. If it is determined that one of the file servers is running out of storage space, such as if the amount of available storage space falls below a predetermined level, then the storage manager system 220 moves some data from that file server to one or more of the other file servers. The storage manager system 220 can also automatically move a data file when one of the client machines attempts to move the data file to a file server that has a stored data level that has exceeded a predetermined storage threshold. In such a case, a client machine may attempt to move a data file from file server A to file server B, wherein the storage manager system determines that the amount of data on file server B has exceeded a threshold. Rather than moving the data file from file server A to file server B, the storage manager system 220 moves the data file to file server C that has been determined to have available data storage space. The storage manager then creates a link from the original location of the file server at file server A to the new location at file server C. This can be calculated to result in a relatively even distribution of data among the available file servers or could simply result in making more space available on the file server that was overloaded from the standpoint of data storage space, depending on how the storage manager is configured.

In another aspect of file server load balancing, the storage manager system 220 is also configured to monitor and balance the load on the file server CPUs or data input/output throughput of the file servers. It can monitor the file server CPU usage and data input/output throughput by querying server Application Program Interfaces (APIs). If it is determined that one of the file servers is receiving a much larger number of data processing requests from the client machines than the other file servers, then the storage manager system 220 moves some data from the file server that is receiving the large number of data processing requests to one or more other file servers. For load balancing, the storage manager system 220 can move the data to another file server that has less of a data request load. In this way, high-demand files will not be concentrated, but rather will be spread among the cluster of file servers.

The storage manager system 220 can also be used to enable data redundancy among the file servers. There might be a situation where certain data is in high demand from the client machines or data is deemed to be particularly important. In such situations, the storage manager system 220 can be used to create redundant versions of the data on multiple file servers so that if one of the file servers fails, the data is still available on one of the other file servers.

11. Group Membership Protocol Word

The fail-over operation, scalability of the system, assignment of virtual IP (VIP) addresses to machines, and the ability to dynamically reconfigure such assignments and file mapping, are achieved with the distributed storage manager software through a Group Membership protocol word that provides state sharing information among all the machines clustered in a storage manager system 220. The protocol word is also used to share information among the storage manager machines, such as information regarding the operational mode, the history of file movements, file handle translation tables, and the current state of file movements. The state-sharing Group Membership protocol word is passed around the cluster machines that are members of the same subnet in a token ring arrangement that will be familiar to those skilled in the art.

FIG. 20 is a representation of the Group Membership state protocol word 2000 that can be used by the storage manager computers 222, 224, 226, 228 (FIG. 2) having a construction such as shown in FIG. 5 in communicating the state information among the machines of the distributed storage manager. The protocol word 2000 can include additional header and footer fields that are not shown in FIG. 20, as well as additional payload fields that are used to convey state information and that can be utilized for failover reliability among the machines in a storage manager cluster. The state protocol word 2000 includes a Signal Type (SIG) field 2002 that indicates whether the word is a token message for normal operating conditions or is a notification message (also called a "911" message). The next field is a Sequence (SEQ) field 2004 comprising a number that is incremented by each node as the message makes its way around the nodes of the cluster. The next field is a Membership field 2006 that indicates the group composition of the storage manager system 220, followed by a VIP List and Assignments field 2008, and an Operational Data field 2010 containing load and byte count data that indicates the data flow rate through a node. In particular, the data flow rate is indicated by information retrieved from the NIC of the node.

The protocol word 2000 also includes a Configuration field 2012 that includes configuration information regarding the storage manager system 220. The next field is a History field 2016 that contains information relating to past file movement operations. The File Handles Translation Tables field 2020 contains data that maps the actual locations of data files to the locations for which client machines access the data files. The protocol word 2000 also includes a Current File Movement Status field 2024 that includes data relating to the status of a file movement operation that is currently in progress.

Each received Group Membership message, whether it is a normal token message or a "911" message, is parsed by the group membership management component 508 (shown in FIG. 5) of the distributed storage manager software of each particular cluster machine to extract the necessary data. As described below, the Group Membership protocol word 2000 is the means by which the file mapping functionality of the network attached storage is preserved by the storage manager system 220 in a manner that is transparent to the client/application servers and to the network attached storage.

The Sequence number field 2004 is incremented by each node when it receives a message (a token message or 911 message). An initial random sequence number is selected as a default start value, and when the sequence numbering reaches a predetermined limit value, the sequence numbering wraps around and begins at the start value. When a node puts a message on the subnet, that node increments the sequence number that was contained in the received token, places the incremented token back out on the subnet, and stores the incremented number in memory. Thus, any message produced by a node will have a unique sequence number. A node should not receive a token message with a sequence number lower than the sequence number stored in its memory.

The Membership field 2006 in a token message is a collection of sub-fields to indicate group composition. In particular, the Membership field of one embodiment contains data that provides the number of nodes or machines in the storage manager, a list of the nodes, the current node sending the token message, and the destination node (the next node in the storage manager, the node to whom the message is being sent). Each node changes the appropriate membership field values when the node receives the token, and in this way ensures that the token is passed along the machines in the storage manager, from node to node in proper sequence.

For example, the "number of nodes" field in a token message might indicate a storage manager having four machines, or network nodes, such as illustrated in FIG. 2. The token message might indicate subnet addresses of (1.1.1.1), (1.1.1.2), (1.1.1.3), and (1.1.1.4) in the "list of nodes" data of the Membership field 2006. If the nodes are numbered, from first to last, as −1, −2, −3, and −4, and if, at a particular point in time, the token is being sent from the second node (node −2) and is received at the third node (−3), then the "current node" value is "2" (the second node in the storage manager) and the "destination node" value is "3" (the third node). After the third node (−3) receives the token, the third node changes the "current node" to "3", changes the destination node to "4", and sends the token back out on the subnet to the next node. In this way, each node always knows whether it is the intended recipient of a token message.

The Membership field 2006 in a "911" message includes two sub-fields comprising an originating node address and a permission flag. If a node has not received a Group Membership message from another node for greater than a time-out interval, then the node will send out a "911" notification Group Membership message. Thus, a "911" message is sent by a node (the "originating node") when that node determines that the token message might have been lost somewhere in the cluster, and therefore might need to be regenerated. This can occur, for example, if another node fails when it has possession of the token message for processing. In that case, the originating node of the "911" message needs to determine if it has the latest copy of the token to regenerate the token. This determination is made with the help of the "911" message.

As a "911" message is sent around the machines of a distributed storage manager, the permission flag value in the message is set to TRUE by each node when it receives the "911" message, unless a receiving node has a higher sequence number stored in its memory for the last token message it sent out. If the receiving node has a higher sequence number, then it sets the permission flag to FALSE before putting the "911" message back out on the subnet. When the originating node receives back the "911" message, it will examine the message to determine if the permission flag sub-field contains TRUE or FALSE. If the permission flag is FALSE, then the originating node will not regenerate the token message it has in memory. That is, when the "911" message received by the originating node says FALSE, that means another node has already sent out a more recent token, with a higher sequence number. Therefore, the originating node will wait for the next token message (having a higher sequence number), and will adopt the system values (VIP list, membership, etc.) that are indicated in that token. If the originating node receives a "911" message back with TRUE, then the originating node knows it has the most recent token, so it will re-send the last token message it has, with all its system values (VIP list, membership, etc.). The unique sequence number ensures that only one node, the one with the most recent token message, will change the permission flag to TRUE.

The VIP List and Assignments field 2008 of the Group Membership protocol word 2000 contains a list of virtual IP addresses (VIP list) and of corresponding node assignments for those addresses. The VIP List and Assignments field contains sub-fields of data that specify the VIP address, the primary IP address to which that VIP address is currently assigned, an indication for each VIP address whether there is a preference for assignment to that address, and a persistence or "sticky" flag to indicate whether the preference is "sticky". A sticky VIP address assignment means that the VIP address will be forced to an assignment to the primary IP address of that particular node, so that all traffic for that VIP address must be directed to that node IP address, unless the machine is unavailable. Thus, a sticky assignment in the Membership field means that all data traffic for that node will be directed to that node, if the node is available. If the node fails, traffic will be re-routed by the machines of the cluster. If the node comes back up, then the data traffic intended for the node will again be directed to that node. A persistence flag set to a non-zero value indicates that a user has indicated a preference for assigning that VIP address to the node involved.

For example, if there are four addresses in the VIP list, then the information in the VIP List and Assignment field 2008 might be summarized in Table 1 below:

TABLE 1

| VIP Address | Current Host | Preferred Host | Persistence Flag |
| --- | --- | --- | --- |
| 1.1.1.1 | 1.1.1.5 | 1.1.1.6 | 0 |
| 1.1.1.2 | 1.1.1.5 | 1.1.1.5 | 1 |
| 1.1.1.3 | 1.1.1.6 | 0.0.0.0 | 0 |
| 1.1.1.4 | 1.1.1.6 | 1.1.1.6 | 3 |

As Table 1 shows, the VIP List and Assignment field 2008 contains four sub-fields: VIP address, Current Host, Preferred Host, and Persistence Flag. Each of the first three fields holds the value of an IP address (four integers separated by a delimiter character). The last field is an integer. In the preferred embodiment, data in the VIP List and Assignment field 2008 will be placed in sequence, so that data for the first row of Table 1 is listed first in the Group Composition field, followed sequentially by data for the second row, and so forth. Other schemes for packing the Group Composition field can be used.

In the VIP List and Assignment field 2008, there is one VIP address sub-field, providing a VIP list for the entire storage manager cluster. The first sub-field, VIP address, lists the VIP addresses for the entire distributed storage manager. The second sub-field, Current Host, specifies which node currently owns this particular VIP address. The primary IP address of that node is used in the Current Host value. For example, according to Table 1, node (1.1.1.5) owns, or is assigned, VIP addresses (1.1.1.1) and (1.1.1.2). The third sub-field, Preferred Host, indicates the node at which this VIP prefers to be hosted. For example, to move VIP address (1.1.1.1) from Node (1.1.1.5) to Node (1.1.1.6), it would be necessary to specify Current Host as (1.1.1.5), and Preferred Host as (1.1.1.6). The VIP address assignments indicated by the Current Host and Preferred Host data sub-fields can be changed by a user during real-time operation of the distributed storage manager application through a user interface, which is described in greater detail below.

The last sub-field of the VIP List and Assignment field 2008 is the Persistence Flag. It indicates whether the associated VIP address is "sticky" to the Preferred Host. When a VIP address is "sticky" to an assigned node (the one it is associated with in the same row of Table 1), it is no longer handled by the load balancing process of the distributed storage manager application wrapper. The Persistence Flag field can take three possible integer values: "0", "1" and "3". When it is "0", it means that the associated VIP address is not sticky to any node. This VIP address can be moved, if so required by the load balancing process. When the Persistence Flag is "1", it means this VIP address is sticky to the Current Host specified in the same row of Table 1, and therefore it is not handled by the load balancing process. If the Current Host fails, this VIP address assignment will move to another node of the subnet, and will become sticky to that node. It will stay on that node even if the original Host recovers. When the Persistence Flag is "3", it means this VIP address is sticky to the Preferred Host.

Whenever the Preferred Host is functioning (alive), the VIP address will move to the Preferred Host node and stay with it (becomes "sticky" to it). When the Preferred Host fails, it fails over to another node of the subnet. The VIP address will move back to the Preferred Host when the Preferred Host recovers. It should be noted that regardless of which value the Persistence Flag takes, when the Current Host fails, the associated VIP address will always fail over to a healthy (alive) node. As described further below, the "sticky" feature of a VIP address assignment can be changed by a user in real time through a system interface.

Returning to FIG. 20, another data field of the protocol word 2000 is the Load And Byte Count data field 2010. This data field indicates the traffic flow of message packets through each of the distributed storage manager machines of the cluster subnet. In one embodiment, the data comprises a byte count of data through the network interface card that connects each distributed storage manager machine to the subnet. As with the VIP List and Assignment field 2008, the byte count field 2010 is organized in the protocol word such that the data for the first node occurs first, then the second node, then the byte count data for the third node, and so forth for each of the machines in the cluster who are connected to the pertinent subnet. The byte count data can include file system data for ensuring proper mapping between the clients/application servers and the network data storage.

Another field is the configuration field 2012, which contains configuration parameters for the storage manager system 220. In particular, the configuration field 2012 includes data that identifies the operational mode (in-band or out-of-band) and a list of identifiers for the file servers 208 that are being managed by the storage manager system 220.

The History field 2016 of the protocol word 2000 contains information regarding file movement operations that have occurred over a past time period, such as over the past month. For each file movement operation that has occurred over the time period, the History field includes a transaction ID number, the time and date that the transaction took place, the location to which data file(s) were moved, the location from which data file(s) were moved, and the total size of data files that were moved in the file movement operation.

The File Handles Translation Tables field 2020 contains data that maps the actual locations of data files on the file servers 208 to the locations where the client machines 202 access the data files. For each data file that has been moved, the File Handles Translation Tables field 2020 includes a pair of information items, including the actual location of the data file on the file servers 208 and the locations where the client machines 202 access the data file.

Finally, the Current File Movement Status field 2024 contains data that describes the status of a file movement operation that is currently being performed by the storage manager system 220. This field includes a listing of all files to be moved pursuant to the file movement operation, the directory structure for files to be moved, a list of files that have already been moved, and a list of files that still need to be moved.

In accordance with the invention, the protocol word 2000 is circulated around the subnet from machine to machine, in sequence. Each machine receives a protocol word as part of the group membership message that is passed from machine to machine approximately at a rate of once every 100 milliseconds. Other message passing rates can be used, depending on the network configuration and machine operation.

12. Machine Operation

Figure 21:
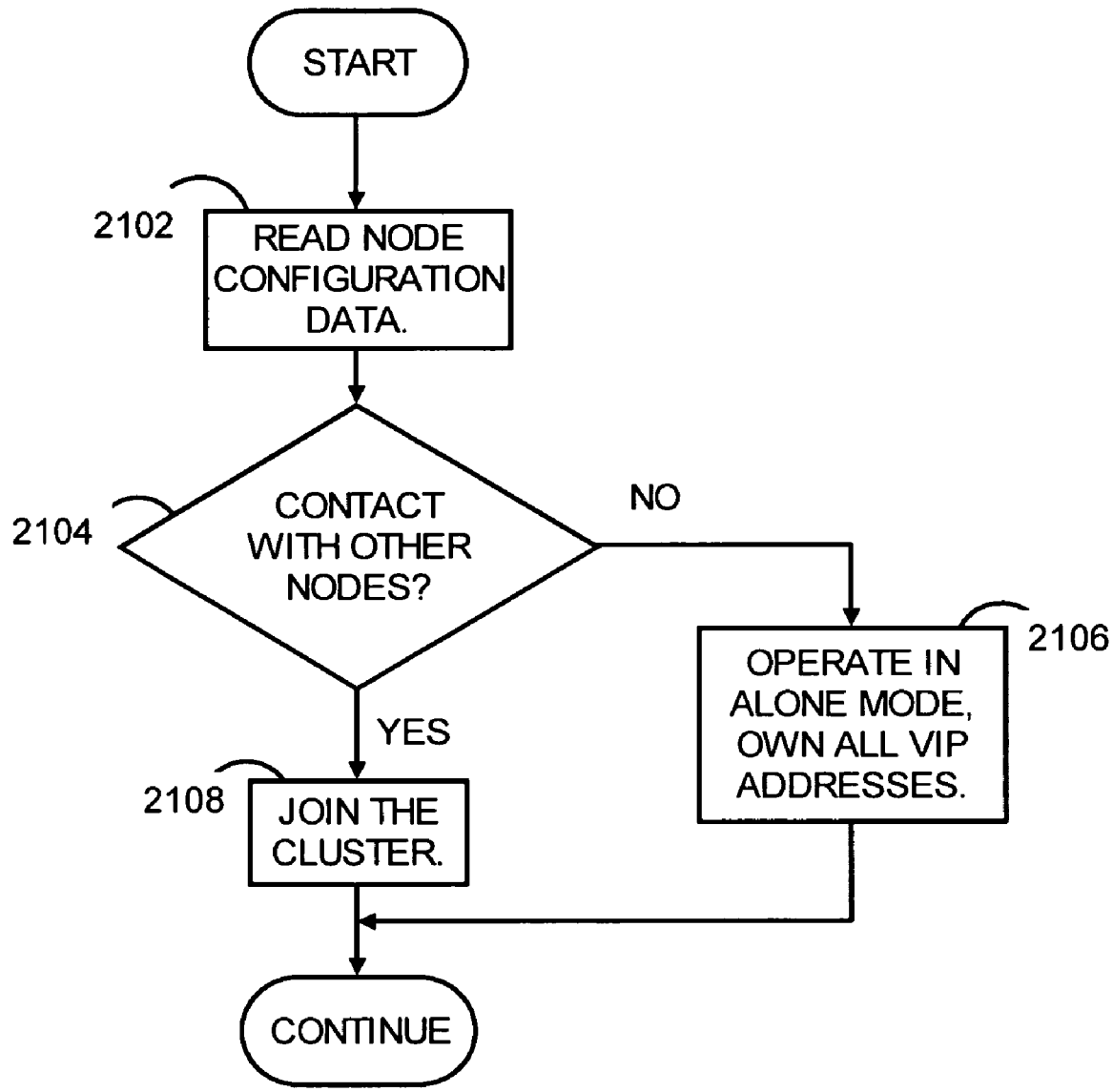
FIG. 21 is a flow diagram of the operating steps executed by a computer of the distributed storage manager in starting up and processing group membership messages on a subnet of the server system.

FIG. 21 is a flow diagram of the operating steps executed by a distributed storage manager computer of FIG. 3 in starting up and processing group membership messages on a subnet of the system. This processing is executed by the computer from its program memory once the appropriate distributed storage manager application software is loaded onto the computer and the setup operation has been completed.

a. Start-Up

In the first processing step performed by the starting computer, represented by the flow diagram box numbered 2102, the configuration data of the machine is read from the direct access storage device, such as the hard disk of the computer. The configuration data includes a number of stored configuration files, including a node map, and the virtual IP addresses of the storage manager machines, or cluster. The configuration data further includes cluster configuration options, local fault monitoring specification for the machine, and a license key or password. The node map contains the primary IP addresses of all the nodes in the storage node cluster, in an arbitrary ordering around the subnet that is determined by the user during the setup process. The configuration files specify the "initial" cluster setup. Users can change these settings at runtime with the user interface described below. Such runtime changes will not affect the configuration files, though a user can manually edit them with a text editor.

From the node map of the configuration data, the computer that is starting up knows whether it has companion machines in the subnet cluster, and it knows how many additional machines to expect in the cluster. Therefore, the starting computer next will attempt to contact all of the other machines on the subnet and determine if it is the first executing machine in the cluster. This process is represented by the decision box numbered 2104.

The process of a starting computer to determine if it is the first operational node involves first sending a unicast UDP (User Datagram Protocol) packet message. The UDP message implements a conventional connectionless protocol message that provides a means of sending and receiving datagrams over a network. Those skilled in the art will be familiar with the use of UDP packet messages. The UDP message sent by a starting computer includes a Group Membership protocol word, as described above in conjunction with the description of FIG. 20.

If the starting computer is actually attempting to recover or regenerate a token, and is not involved in an initial start sequence, then it could use the UDP message to send a "911" or notification message, as described above. When the computer rejoins the cluster, it will use the current cluster setup information in a token message for the cluster properties. If the starting computer is actually starting up from a cold start, then the UDP message will comprise a token message, such as that described above, that includes all the node data and configuration information that the starting computer retrieved from its configuration files. In either case, the computer that sends out the message waits for a reply.

If the starting computer receives no replies to the message for all other nodes in the configuration, then it knows it must be the first node in the cluster. This corresponds to an affirmative (YES) outcome at the decision box numbered 2104. If the starting computer is the first cluster computer, then it assumes responsibility for all the VIP addresses in the cluster. Thus, it will set the data fields in the Group Membership protocol word accordingly, and continue data traffic handling operation while it waits for the other machines of the cluster to join. In accordance with operation of the cluster machines of the invention, the starting computer will send out a gratuitous ARP (Address Resolution Protocol) message for each VIP address that it takes. This mode of operation is referred to as "alone mode", and is indicated by the FIG. 21 flow diagram box numbered 2106.

Those skilled in the art will be familiar with the conventional ARP scheme for translating logical IP addresses into physical network interface addresses in conjunction with stored address resolution information. More particularly, the network interface addresses are also known as Media Access Control (MAC) addresses for network cards. The ARP message is a conventional means of storing logical to physical address data in the machines connected to a network, such as each of the subnets connected to the starting computer. Thus, for each subnet to which it is connected, the starting computer will determine if it is the first node and, if it is, the starting computer will send out a gratuitous ARP message for the VIP addresses that it is taking.

If the starting computer receives a reply to the UDP message, then it knows other machines are active in the cluster, and it will attempt to join the cluster. This corresponds to the "join cluster" processing of box 2108, following the negative outcome (NO) of the decision box 2104. Any node that is already active and has received the UDP message from the starting computer will accept the starting computer into the operating cluster, in the following manner.

As noted above, a starting computer will send a 911 message with a Group Membership protocol word over the subnet with the data it has retrieved from its configuration files. When the operating node receives the 911 message from the starting computer, the operating node processes the node list in the message and adds the starting node into the list, as appropriate. Thus, permanent connections specified by initial data can indicate a particular VIP address assignment, or predetermined default assignments can be used. In either case, the operating node adds the new node into the node list data and then puts the processed Group Membership token back out onto the subnet. When the starting computer receives back the Group Membership token, it will process the node assignment data to reflect the presence of the operating node, and it thereby becomes part of the cluster. The starting computer will then pass the Group Membership token along, back out onto the subnet, in its normal operation.

b. Group Membership Message Processing.

Figure 22:
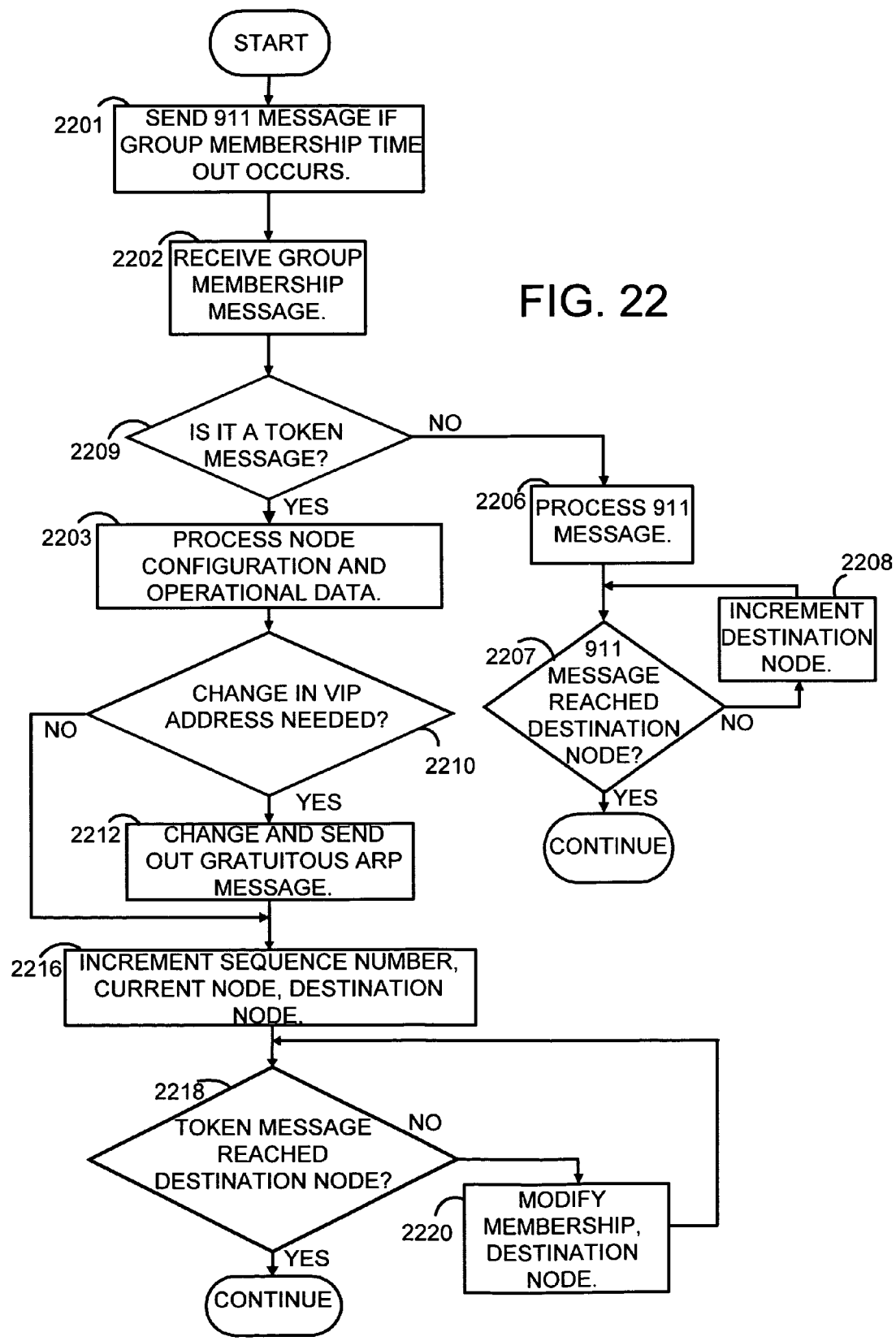
FIG. 22 is a flow diagram that shows details of the group membership message processing performed by each of the distributed storage manager computers.

FIG. 22 is a flow diagram that illustrates the Group Membership message processing performed by each of the computers comprising the distributed storage manager 220 of FIG. 2 during normal operation, as a node in a cluster. In general, for the distributed storage manager application software, a token acts as a failure detector. Therefore, if a token does not reach the specified destination node from a current node, the current node will assume the destination node is down. As a result of not receiving an acknowledgment, the current node will modify the group membership information on the token accordingly, and will send the token to the next node in the subnet cluster, past the previous destination node. In contrast to the token processing described above, a "911" message will not modify the membership on the token when the destination cannot be reached. It will simply increment the destination node, and send to the next node in the subnet ring. This processing is illustrated in FIG. 22, as explained further below.

First of all, if a node 222, 224, 226, 228 (FIG. 2) has not received a Group Membership message from another node for greater than a time-out interval, then the node will send out a "911" notification Group Membership message, as was described above in conjunction with FIG. 20. This processing is represented by the flow diagram box numbered 2201. In the next step of normal message processing, represented by the FIG. 22 flow diagram box numbered 2202, the node receives a Group Membership message. The node next determines whether the message is a token message or a "911" notification message, by examining the signal type message field described above in conjunction with FIG. 20. If the message is not a token message, then it is a "911" message, a negative outcome at the decision box numbered 2209. As indicated by the flow diagram box numbered 2206, the node will process the "911" message to examine the sequence number, determine if the sequence number it has is greater than the received sequence number, and process the permission flag. The node can determine that the "911" message is one that it sent, in which case it may need to regenerate the last token message it sent (if permission="TRUE"). In that case, it will regenerate the token, and put the message token back out onto the subnet. If it did not send the "911" message, then the node will determine if it has a sequence number greater than that in the message. If it has a higher sequence number, it will set the permission flag (FALSE) accordingly, and send the message back out onto the subnet. If the node does not have a higher sequence number, it does not change the permission flag setting, and the sends the message onto the subnet to the next node.

Whether or not the originating node changes the permission flag, it waits for an acknowledgment from the next node (the destination node) after sending the "911" message back out onto the subnet. This is represented by the decision box numbered 2207. If the originating node receives a response, an affirmative outcome at the decision box numbered 2207, it continues with normal processing. If the originating node does not receive an acknowledgment response within the timeout interval, a negative outcome at the decision box 2207, then the originating node increments the destination node in the "911" message to skip the non-responsive node on the subnet, and sends out that modified "911" message. This processing is represented by the flow diagram box numbered 2208. The originating node then waits for that new destination node to respond, in accordance with the decision box 2207.

Token failure detection generally assumes that failure to receive an acknowledgment within a predetermined time interval indicates that a message never reached the destination node, and therefore assumes that the destination node is down. Such failure detection is not totally reliable, however, as a failure to respond within the time interval may simply indicate a slow node. Thus, in a conventional asynchronous network environment, a reliable failure detector is virtually impossible to build, since one cannot tell a "dead" or down node from a "very slow" node. Under operations of the distributed storage manager application software, however, if a "slow node" is mistaken for a "dead node" and is deleted from the list of active nodes, then the slow node will rejoin the cluster automatically. This is accomplished because of the following sequence of events: When a slow node is waiting for the token to arrive, its timeout interval will expire. That node will then send out a "911" message, thinking that the prior node is down. The "911" message will be regarded by the other nodes as an add request to join the cluster, and that slow node will effectively be added back into the distributed storage manager.

If the received Group Membership message is a token message, an affirmative outcome at the decision box 2209, then the node processes the information contained in the message. This processing is represented by the flow diagram box numbered 2203. Thus, changes in VIP address assignments can be received, or changes in such assignments may need to be implemented, in response to load information in the operational data. At the decision box numbered 2210, the node can determine that a change in VIP address assignment is needed. The node can make this determination, for example, if the load level it is experiencing, or if the load level it sees another node experiencing, exceeds a predetermined byte rate load level limit.

Thus, individual nodes in a cluster can observe the configuration and operational data in a token message and recognize that another node in the cluster is receiving a sufficiently great amount of data traffic, due to its VIP address assignments, that the performance of the cluster as a group could be improved if the load of the other node is reduced. If that is the case, then the message processing node that has received the token message and has observed the need for reassignment will proceed with a VIP address reassignment in which the processing node will reassign one or more VIP addresses from the overloaded node to itself, or even reassign VIP addresses from itself to another node. For example, each processing node that recognizes an overloaded condition can take one additional VIP address assignment. If the next node that receives the token message sees that the overloaded condition still exists, it will take another VIP address assignment for itself. In this way, dynamic load balancing will occur during real time operation of the cluster.

If the processing node determines that a reassignment of VIP addresses is needed, an affirmative outcome at the decision box 2210, then the node will implement whatever reassignment its processing dictates by changing the VIP address data in the VIP List and Assignment field 2008 (FIG. 20) of the token message. Whenever there is a new or changed VIP address assignment, the node making the change sends out the ARP message mentioned above in connection with startup processing. Unlike the startup processing, however, this ARP message occurs during normal processing, and is prompted not by startup processing but by the desire to change assignments and inform the other nodes. The message is therefore referred to as a "gratuitous" ARP message. This processing is represented by the flow diagram box numbered 2212. Those skilled in the art will understand that each machine connected to a subnet includes an ARP cache that contains data to translate logical IP addresses into physical MAC addresses, and will further understand that an ARP message is a message that is sent out over a network and is automatically processed by any computer communicating with that network to store the ARP message information into the ARP cache of the computer. The clients and routers on the subnet will receive the ARP message and will then automatically refresh their respective ARP caches with the new assignment information. All such processing is incorporated into the processing of the flow diagram box numbered 2212.

After the token message is processed, with or without VIP address changes, the node increments the sequence number and changes the current node and destination node data fields of the message, as described above with respect to FIG. 21. The node then sends the token message back out on the subnet to the next node. This processing is represented by the flow diagram box numbered 2216.

After the originating node sends the token message onto the subnet, it waits for an acknowledgment from the destination node. If the originating node receives a response, an affirmative outcome at the decision box numbered 2218, it continues with normal processing. If the originating node does not receive an acknowledgment response within the timeout interval, a negative outcome at the decision box, then the originating node modifies the active membership list for the cluster to delete the non-responsive node, then increments the destination node number on the subnet to skip the non-responsive node, and sends out that modified token message onto the subnet. This processing is represented by the flow diagram box numbered 2220. The originating node then waits for that new destination node to respond, in accordance with the decision box 2218.

As described above, a storage manager system constructed in accordance with the present invention manages the storage of data on multiple NAS units, making all the storage on the NAS units available to the network clients and servers. The storage manager system is constructed with a distributed architecture, so that multiple processor units each comprising a storage manager can cooperate together to provide the desired functionality of the collective whole. That is, the functionality of the collective group does not change with the number of processor units comprising the storage manager system. Thus the distributed storage manager does not present a single point of failure for access to the data files.

The present invention has been described above in terms of at least one embodiment so that an understanding of the present invention can be conveyed. There are, however, many configurations for network storage traffic systems not specifically described herein but with which the present invention is applicable. The present invention should therefore not be seen as limited to the particular embodiments described herein, but rather, it should be understood that the present invention has wide applicability with respect to network data storage generally. All modifications, variations, or equivalent arrangements and implementations that are within the scope of the attached claims should therefore be considered within the scope of the invention.

We claim:

1. A method of processing requests relating to data movement for network storage devices, the method comprising:
   receiving file movement instructions to move a first data file from a first network storage device to a second network storage device;
   moving the first data file from a first location at the first network storage device to a second location at the second network storage device, said moving comprising providing access to the first data file by a client machine during said moving; and
   automatically mapping the first location at the first network storage device to the second location at the second network storage device so that a client machine can access the first data file using a data file pathname that does not change when the data file is moved from the first location to the second location to thereby render the data file move transparent to the client machine.

2. A method as defined in claim 1, further including:
   detecting a data access request wherein a client machine is attempting to access the first data file before the first data file has been moved, thereby causing a data access conflict between a party that is attempting to move the first data file pursuant to the file movement instructions and the client machine that is attempting to access the first data file; and
   resolving the data access conflict according to a predetermined priority scheme that defines which party is granted access to a data file.

3. A method as defined in claim 2, wherein resolving the data access conflict according to a predetermined priority scheme comprises providing the client machine with access to the first data file prior to moving the first data file from the first network storage device to the second network storage device.

4. A method as defined in claim 2, wherein resolving the data access conflict according to a predetermined priority scheme comprises moving the first data file from the first network storage device to the second network storage device prior to providing the client machine with access to the first data file.

5. A method as defined in claim 1, wherein the file movement instruction is received and the data access request is detected by a storage manager machine that is located at a network switch that communicatively connects the network storage devices to at least one network client.

6. A method as defined in claim 5, wherein the storage manager system operates in an in-path mode wherein communications between the network storage devices and network client machines pass through the storage manager machine, and in an out-of-path mode wherein communications between the network storage devices and the network clients machines bypass the storage manager machine.

7. A method as defined in claim 6, wherein the storage manager machine automatically switches to the in-path mode prior to moving the first data file.

8. A method as defined in claim 5, wherein the storage manager machine operates as a network bridge device.

9. A method as defined in claim 5, wherein the storage manager machine operates as a network router device.

10. A method as defined in claim 1, wherein mapping the first location at the first network storage device to the second location at the second network storage device comprises creating a symbolic link that redirects a request to access the data file at the first location to the second location.

11. A network data storage manager system for a computer network, the system comprising:
  a network interface that permits access to communication between one or more network client machines that request data files and network storage devices at which the data files are stored, such that network requests for data files can be received and processed;
  a memory in which instructions and data are stored; and
  a processor, coupled to the memory, such that the processor receives the instructions stored in the memory and executes the instructions to perform a data movement transaction to move one or more data files between different network storage devices in a manner that is transparent to the client machines such that a client machine can access a data file during and after movement of the data file by providing a network request over the network interface and referencing a data path that does not change when the storage manager system moves the data file.

12. A distributed network data storage system as defined in claim 11, wherein the storage manager system is communicatively attached to a switch on the computer network, and wherein communication signals between the network client machines and the network storage devices through the switch.

13. A distributed network data storage system as defined in claim 11, wherein the computer network comprises a first subnetwork that includes the client machines and a second subnetwork that includes the network storage devices, and wherein the storage manager system functions as a router that connects the first subnetwork and the second subnetwork to one another.

14. A distributed network data storage system as defined in claim 11, wherein the storage manager system operates in at least two modes, including:
  an in-path mode in which communications between the network client machines and the network storage devices pass through the storage manager system; and
  an out-of-path mode in which communications between the network client machines and the network storage devices bypass the storage manager system.

15. A distributed network data storage system as defined in claim 12, wherein the storage manager system causes the switch to operate in at least two virtual segments during an in-path operational mode, with a first virtual segment being connected to a first virtual local area network (VLAN) that includes the client machines, and a second virtual segment being connected to a second VLAN that includes the network storage devices, and wherein the storage manager system communicatively connects the first and the second virtual segments of the switch so that communications between the client machines and the network storage devices pass through the storage manager system.

16. A distributed network data storage system as defined in claim 14, wherein the storage manager system operates in the in-path mode when the storage manager system is performing a data movement transaction.

17. A distributed network data storage system as defined in claim 11, wherein the storage manager system processes communications that conform to predetermined computer network data storage and access protocols.

18. A distributed network data storage system as defined in claim 17, wherein the protocols include stateful protocols.

19. A distributed network data storage system as defined in claim 17, wherein the protocols include stateless protocols.

20. A distributed network data storage system as defined in claim 17, wherein the protocols include protocols from at least one of either the Common Internet File System (CIFS) or the Network File System (NFS).

21. A distributed network data storage system as defined in claim 11, wherein the storage manager system comprises a cluster of at least two storage manager machines, wherein each storage manager machine can individually perform the functionality of the storage manager system so that one storage manager machine can take over the duties of another storage manager machine that has failed.

22. A distributed network data storage system as defined in claim 11, wherein the storage manager machines share state information by sharing a protocol word with one another.

23. A distributed network data storage system as defined in claim 11, wherein the storage manager system performs a data movement transaction by moving a first data file from a first location on a first network storage device to a second location on a second network storage device.

24. A distributed network data storage system as defined in claim 23, wherein the storage manager system establishes a symbolic link that links the first location to the second location.

25. A distributed network data storage system as defined in claim 23, wherein the storage manager system can perform the data movement transaction without requiring any software to be installed on the client machines or the network storage devices.

26. A distributed network data storage system for a computer network, the system comprising:
  a network interface that permits communication between one or more network client machines that request data files and network storage device devices at which the data files are stored, such that network requests for data files can be received and processed; and
  a distributed storage manager application that accesses data files, specified in a data request, that are stored at the network storage devices using a network file mapping interface of the network storage devices, wherein the network file mapping is dynamically determined to provide the correct mapping,
  and such that the data stored on the network storage devices or which is being moved to a network storage device is available to network clients and servers in a single virtual volume, the distributed file manager translating a file location in the virtual volume to a file location on a physical volume in an operation that is transparent to the network clients and servers.

27. A system as defined in claim 26, wherein the network file mapping utilizes the transfer control protocol/Internet protocol (TCP/IP).

28. A system as defined in claim 26, wherein the storage manager application operates to dynamically determine the network file mapping such that network clients and servers do not need to reconfigure the volume mapping when new network storage devices are added to or removed from the system, thereby permitting the clients and servers to continue accessing the virtual volume, such that the clients and servers only detect that the size of the virtual volume is changed in accordance with the network storage devices added or removed from the system, and such that any file movements between the network storage devices are transparent to the clients and servers.

29. A system as defined in claim 26, wherein the storage manager application is installed on multiple processor units, each comprising a storage manager, such that the storage managers cooperate together to provide the storage manager application functionality as a collective whole, such that the functionality of the collective whole is provided regardless of the number of processor units comprising the storage manager application, thereby provided a distributed storage manager that does not present a single point of failure for access to the data files.

30. A storage manager system for processing requests relating to data movement for network storage devices, the system comprising:
    a memory in which instructions and data are stored; and
    a processor, coupled to the memory, such that the processor receives the instructions stored in the memory and executes the instructions to perform operations comprising:
    receiving file movement instructions to move a first data file from a first network storage device to a second network storage device;
    moving the first data file from a first location at the first network storage device to a second location at the second network storage device, said moving comprising providing access to the first data file during said moving; and
    automatically mapping the first location at the first network storage device to the second location at the second network storage device so that a client machine can access the first data file using a data file pathname that does not change when the data file is moved from the first location to the second location to thereby render the data file move transparent to the client machine.

31. A storage manager system as defined in claim 30, wherein the processor executes the instructions to perform operations further comprising:
    detecting a data access request wherein a client machine is attempting to access the first data file before the first data file has been moved, thereby causing a data access conflict between a party that is attempting to move the first data file pursuant to the file movement instructions and the client machine that is attempting to access the first data file; and
    resolving the data access conflict according to a predetermined priority scheme that defines which party is granted access to a data file.

32. A program product for use in a computer that executes program steps recorded in a computer-readable media to perform a method of processing requests relating to data movement for network storage devices, the program product comprising:
    a recordable media; and
    computer-readable instructions recorded on the recordable media, comprising instructions executable by the computer to perform operations comprising:
    receiving file movement instructions to move a first data file from a first network storage device to a second network storage device;
    moving the first data file from a first location at the first network storage device to a second location at the second network storage device, said moving comprising providing access to the data file during movement of the data file from the first location to the second location; and
    automatically mapping the first location at the first network storage device to the second location at the second network storage device so that a client machine can access the first data file using a data file pathname that does not change when the data file is moved from the first location to the second location to thereby render the data file move transparent receiving file movement instructions to move a first data file from a to the client machine.

33. A program product as defined in claim 32, wherein the plurality of computer-readable instructions executable by the computer cause the computer to perform operations further comprising:
    detecting a data access request wherein a client machine is attempting to access the first data file before the first data file has been moved, thereby causing a data access conflict between a party that is attempting to move the first data file pursuant to the file movement instructions and the client machine that is attempting to access the first data file; and
    resolving the data access conflict according to a predetermined priority scheme that defines which party is granted access to a data file.

34. A distributed network data storage system for a computer network, the system comprising:
    a network interface that permits access to communication between at least one client machine that requests data files and at least one network storage device at which the data files are stored, such that network requests for data files can be received and processed;
    a memory in which instructions and data are stored; and
    a processor, coupled to the memory, such that the processor receives the instructions stored in the memory and executes the instructions to perform a data movement transaction to move one or more data files between different network storage devices, and wherein the storage manager system communicates over the network interface and provides the client machine with uninterrupted access to the data files during the data movement transaction.

* * * * *